US012340956B2

(12) United States Patent
Nishide et al.

(10) Patent No.: US 12,340,956 B2
(45) Date of Patent: Jun. 24, 2025

(54) DC HIGH-VOLTAGE RELAY, AND CONTACT MATERIAL FOR DC HIGH-VOLTAGE RELAY

(71) Applicant: TANAKA KIKINZOKU KOGYO K.K., Tokyo (JP)

(72) Inventors: Sachihiro Nishide, Tomioka (JP); Tetsuya Nakamura, Tomioka (JP); Nobuhito Yanagihara, Tomioka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 356 days.

(21) Appl. No.: 17/642,667

(22) PCT Filed: Sep. 8, 2020

(86) PCT No.: PCT/JP2020/033849

§ 371 (c)(1),
(2) Date: Mar. 11, 2022

(87) PCT Pub. No.: WO2021/049469

PCT Pub. Date: Mar. 18, 2021

(65) Prior Publication Data

US 2022/0328260 A1 Oct. 13, 2022

(30) Foreign Application Priority Data

Sep. 13, 2019 (JP) ................................ 2019-167561

(51) Int. Cl.
*H01H 1/0237* (2006.01)
*C22C 5/06* (2006.01)
(Continued)

(52) U.S. Cl.
CPC ............ *H01H 1/0237* (2013.01); *C22C 5/06* (2013.01); *H01H 50/44* (2013.01); *H01H 50/546* (2013.01)

(58) Field of Classification Search
None
See application file for complete search history.

(56) References Cited

U.S. PATENT DOCUMENTS 5,198,015 A 3/1993 Tsuji et al.
5,546,061 A * 8/1996 Okabayashi .......... H01H 9/443 335/126

(Continued)

FOREIGN PATENT DOCUMENTS

JP H07-235248 A 9/1995
JP H08-269640 A 10/1996

(Continued)

OTHER PUBLICATIONS

Office Action issued in corresponding European Patent Application No. 20864167.0 dated May 6, 2024 (9 pages).

(Continued)

*Primary Examiner* — George Wyszomierski
(74) *Attorney, Agent, or Firm* — Foley & Lardner LLP

(57) ABSTRACT

A DC high-voltage relay with at least one contact pair including a movable contact and a fixed contact, the contact pair having a contact force and/or an opening force of 100 gf or more, having a rated voltage of 48 V or more, the movable contact and/or the fixed contact includes a Ag oxide-based contact material. Metal components contain at least one metal M essentially containing Zn, and a balance being Ag and inevitable impurity metals, and the contact material has a content of the metal M of 0.2% by mass or more and 8% by mass or less based on a total mass. The contact material has a material structure in which one or more oxides of the metal M having an average particle size of 0.01 μm or more and 0.4 μm or less are dispersed in a matrix including Ag or a Ag alloy.

11 Claims, 3 Drawing Sheets

(51) Int. Cl.
*H01H 50/44* (2006.01)
*H01H 50/54* (2006.01)

(56) References Cited

U.S. PATENT DOCUMENTS

| | | | | |
|---|---|---|---|---|
| 2003/0184928 | A1* | 10/2003 | Mori | C22C 32/0021 361/6 |
| 2005/0285704 | A1 | 12/2005 | Imanishi et al. | |
| 2019/0280402 | A1* | 9/2019 | Matsuo | B23K 3/0623 |
| 2021/0012977 | A1 | 1/2021 | Nishide et al. | |

FOREIGN PATENT DOCUMENTS

| | | | |
|---|---|---|---|
| JP | H09-134632 | A | 5/1997 |
| JP | 2000-309834 | A | 11/2000 |
| JP | 2004-063190 | A | 2/2004 |
| JP | 2007-012570 | A | 1/2007 |
| JP | 2011-246791 | A | 12/2011 |
| JP | 2012-003885 | A | 1/2012 |
| WO | WO-2019/176891 | A1 | 9/2019 |

OTHER PUBLICATIONS

Office Action issued in corresponding Japanese Patent Application No. 2021-545534 dated Apr. 22, 2024 (6 pages).
Office Action issued in corresponding Japanese Patent Application No. 2021-545534 dated Jul. 29, 2024 (6 pages).
International Searching Authority, "International Search Report," issued in connection with International Patent Application No. PCT/JP2020/033849, dated Nov. 24, 2020.
International Searching Authority, "Written Opinion," issued in connection with International Patent Application No. PCT/JP2020/033849, dated Nov. 24, 2020.
Office Action issued in corresponding Chinese Patent Application No. 202080063115.9 dated Sep. 29, 2023 (14 pages).
Office Action issued in corresponding Korean Patent Application No. 10-2022-7002460 dated Oct. 12, 2023 (13 pages).
Extended European Search Report issued in corresponding European Patent Application No. 20864167, dated Dec. 14, 2022.
Office Action issued in corresponding Indonesian Patent Application No. P00202201186, dated Feb. 22, 2023.

* cited by examiner

| VOLTAGE | LOAD CURRENT | NUMBER OF OPERATIONS | SWITCHING CYCLE |
|---|---|---|---|
| **DC20V** | INRUSH 80A/INTERRUPTION 1A | 10,000 TIMES | **1sON/9sOFF** |

DC HIGH-VOLTAGE RELAY, AND CONTACT MATERIAL FOR DC HIGH-VOLTAGE RELAY

CROSS-REFERENCE TO RELATED APPLICATIONS

The present application claims priority under 37 U.S.C. § 371 to International Patent Application No. PCT/JP2020/033849, filed Sep. 8, 2020, which claims priority to and the benefit of Japanese Patent Application No. 2019-167561, filed on Sep. 13, 2019. The contents of these applications are hereby incorporated by reference in their entireties.

TECHNICAL FIELD

The present invention relates to a DC high-voltage relay (contactor) which performs on/off control of a DC high-voltage circuit. Specifically, the present invention relates to a DC high-voltage relay excellent in an arc discharge property for rapidly extinguishing arc discharge occurring in contact opening, and having a low-contact-resistance/low-heat-generation property during continuous feeding of a current. The present invention also relates to a contact material which is applied to the DC high-voltage relay.

BACKGROUND ART

DC high-voltage relays are used for control of power source circuits and charging circuits of cars having high-voltage batteries, such as hybrid vehicles (HVs), plug-in hybrid vehicles (PHVs) and electric vehicles (EVs), and high-voltage circuits such as those of power conditioners of electrical storage devices in power supply systems such as solar power generation equipment. For example, in the hybrid vehicle or the like, a DC high-voltage relay called a system main relay (SMR) or a main contactor is used. The DC high-voltage relay is similar in basic structure and functions to a DC low-voltage relay which has heretofore used for general automotive applications. It is to be noted that the DC high-voltage relay is a device corresponding to relatively new applications such as the above-described hybrid vehicles and the like, and has differences associated with the applications, and particular problems caused by the differences.

Conventional DC low-voltage circuits will now be described. In the DC low-voltage circuit, a rated voltage and a rated current are clearly specified. For the rated voltage, for example, in a car, a nominal voltage of a battery mounted is DC 12 V, and this nominal voltage is a rated voltage of a general in-vehicle universal relay. DC 24 V batteries are mounted in some trucks and buses, and therefore some relays have a rated voltage of DC 24 V. In this way, a DC low-voltage relay in which the rated voltage and the rated current are clearly specified allows upper limits of a fed current and a load to be relatively easily predicted. Thus, in the DC low-voltage relay, it is necessary that a contact material be improved so as to exhibit durability against a predicted electric power amount and load. For conventional DC low-voltage relays, reduction in size and weight tends to be required for in-vehicle applications and the like. Reduction in size and weight of DC low-voltage relays can be achieved by reduction in size and weight of constituent components, but a burden on the contact material is accordingly increased. Thus, this requirement is met by improvement of durability (i.e. wear resistance and welding resistance) of the contact material.

Ag oxide-based contact materials have been widely used as contact materials for conventional DC low-voltage relays. The Ag oxide-based contact material means a material in which an oxide of a metal such as Sn, In or the like ($SnO_2$, $In_2O_3$ or the like) is dispersed in a Ag matrix or a Ag alloy matrix. In the Ag oxide-based contact material, performance of the contact material is improved by a dispersion enhancing action on metal oxide particles to secure required properties such as wear resistance and welding resistance. For example, the present applicant discloses a Ag oxide-based contact material in Patent Document 1 as a contact material which is applied to in-vehicle DC low-voltage relays.

In improvement of conventional DC low-voltage relays, the amount of oxides in the Ag oxide-based contact material forming a contact pair is increased. This is because in general, in a contact material utilizing a dispersion enhancing action of oxides, welding resistance and wear resistance improves with increased amount of the oxides by enhancing the concentration of metal components that form the oxides. Specifically, Ag oxide-based contact materials are often used in which the amount of metal components other than Ag, such as Sn and In, is 10% by mass or more. This is because when the amount of metal components other than Ag in the contact material is less than 10% by mass, there are cases where the amount of oxides is small, so that required properties are not obtained because of defects such as welding, dislocation and wear. Thus, in DC low-voltage relays, improvement of durability within a specified rated voltage range and securement of durability in reduction in size and weight are achieved by improving Ag oxide-based contact materials as described above.

RELATED ART DOCUMENT

Patent Document

Patent Document 1: JP 2012-3885 A

SUMMARY OF THE INVENTION

Problems to be Solved by the Invention

On the contrary, in DC high-voltage relays, a rated voltage and a rated current are not clearly specified at present. For DC high-voltage relays, required specifications will significantly depend on improvement of battery performance in future. That is, in DC high-voltage relays, it is difficult to predict the upper limit of a load on contacts, and the load will likely increase in future. In this respect, DC high-voltage relays are different from conventional DC low-voltage relays.

It is certain that in DC high-voltage relays, a voltage and a current will be further increased in future. This is evident from a tendency to improve battery performance and enhance power of drive motors in recent years.

In such DC high-voltage relays in which a voltage and a current are to be increased, a plurality of problems different from those of the conventional DC low-voltage relays have been pointed out. Specifically, problems of heat generation and welding at contacts due to an increase in fed current and approach to arc discharge are pointed out.

With regard to the problem of heat generation, the amount of heat generation is proportional to a square of current and a contact resistance value, and therefore it is supposed that a considerable amount of heat will be generated due to a future increase in current in DC high-voltage relays. Abnormal heat generation in relays may cause fatal problems such as ignition and fire damage in a worst-case situation. Welding is a phenomenon in which contact surfaces of a contact pair are melted and firmly fixed to each other by Joule heat during feeding of a current or the like. Such welding at contacts hinders opening of the contact pair, and is liable to cause return failure and breakdown of an overall circuit.

In DC high-voltage relays, the problem of approach to arc discharge is not less important than the problems of heat generation and welding. Arc discharge is roughly divided into one occurring in contact opening and one occurring in closing. In practical use, it is mainly arc discharge occurring in contact opening that causes a problem. When arc discharge occurs in contact opening, the arc discharge cannot be interrupted until an arc voltage reaches a power supply voltage. A minimum arc voltage for causing arc discharge is about 10 V in using a general Ag oxide-based contact material, and in DC high-voltage relays, arc discharge easily continues as the power supply voltage is higher. When arc discharge continues, fatal problems such as ignition and fire damage can be caused as in abnormal heat generation in relays. It is noted that an arc discharge property refers to a property related to strength of arc that can occur in contact opening and closing in the present invention. A contact excellent in an arc discharge property corresponds to a contact causing arc having short duration or low energy. In a contact thus excellent in an arc discharge property, arc can be extinguished, in a DC high-voltage relay, in short time owing to a structure/member for extinguishing arc described below.

For coping with the problems of DC high-voltage relays as described above, measures with respect to structures and mechanisms of the DC high-voltage relays are taken. For example, a contact area is secured by strengthening a contact pressure spring of a contact pair to enhance a contact force between a movable contact and a fixed contact, and contact resistance between the contacts is reduced to suppress heat generation. Enhancement of the contact force also contributes to prevention of ignition and breakage of the relay when the DC high-voltage circuit is short-circuited.

Besides, for coping with arc discharge, many DC high-voltage relays adopt a structure for extinguishing arc discharge having occurred. Specifically, measures such as securement of a sufficient gap between contacts, placement of a magnet for extinguishing an arc and strengthening of a magnetic force of the magnet. In addition, the relay is turned into a hermetically sealed structure, and hydrogen gas, nitrogen gas or a mixed gas thereof is introduced into the relay to more quickly eliminate an arc by an arc cooling effect.

However, the above-described measures with respect to structures and mechanisms cause size increase of a relay body in accordance with an increase of a volume in required specifications. Hence, reduction in size and weight which is a persistent need from a market is not satisfied only with the above-mentioned measures. In particular, in a case where a rare earth element magnet is selected as an arc-extinguishing magnet, a sparse rare earth element is used, and hence the size increase and the strengthening of a magnetic force should be suppressed from the viewpoint of resource depletion. Therefore, in DC high-voltage relays, although measures with respect to structures and mechanisms are important, it is preferable that measures for contacts themselves are taken in addition to these measures.

Heretofore, Ag oxide-based contact materials have been often applied in contacts of DC high-voltage relays as with conventional DC low-voltage relays. However, for coping with the increase in voltage and current in DC high-voltage relays, there is a limit to Ag oxide-based contact materials having the same range of compositions as before. In this respect, in conventional DC low-voltage relays, a durability life is improved by enhancing the concentration of metal components other than Ag in a contact material to increase the amount of oxides as described above. Also in DC high-voltage relays, the increase of the amount of oxides in a contact material can solve the problem of welding by improving durability.

From the viewpoint of contact resistance and heat generation, however, it is not preferable to increase the amount of oxides in a contact material. While Ag is a metal having a high electrical conductivity, a metal oxide is a resistor which reduces an electrical conductivity of the overall contact material. As described above, the amount of heat generation at contacts is proportional to a square of current and contact resistance. The increase of the amount of oxides in a contact material of a DC high-voltage relay increased in voltage and current should be avoided from the viewpoint of suppressing heat generation.

Besides, the increase of the amount of oxides in a contact material cannot solve the problem of arc discharge. In this manner, examples of studies made so far on various contact materials for DC high-voltage relays are only an extension of studies on materials for general switching contacts. There are few examples of reports for practical application to DC high-voltage relays.

The present invention has been made against the backgrounds as described above, and provides a DC high-voltage relay such as a system main relay, which is capable of performing reliable on/off control while coping with problems of arc discharge and heat generation at a contact pair. With respect to the problems, it is necessary that a contact material that stably exhibits a low contact resistance value be applied to a contact for the DC high-voltage relay. The present invention also provides a suitable contact material in consideration of characteristics of a DC high-voltage relay.

Means for Solving the Problems

Since the above-described problems are attributable to a contact portion of a DC high-voltage relay, optimization of a Ag oxide-based contact material forming a contact may be involved in a greater or lesser degree for solving the problems. The optimization of a Ag oxide-based contact material should be, however, in a different direction from the conventional direction including increase of the amount of oxides and the like.

Accordingly, the present inventors gave attention to a characteristic of a DC high-voltage relay before studies on a configuration of a contact material. The characteristic of the DC high-voltage relay is strength of a contact force and an opening force between a fixed contact and a movable contact.

In general, in relays (including contacts having equivalent functions and configurations), an electromagnet or a coil and an optional biasing unit jointly control contact and separation between the fixed contact and the movable contact to perform feeding a current to a circuit and interruption of a circuit (on/off). Examples of the optional biasing unit include contact pressure springs and restoration springs for plunger-type relays, and movable springs and restoration springs for hinge-type relays. Such mechanisms for control of the fixed contact and the movable contact are the same throughout relays independent from the rated voltage.

However, in DC high-voltage relays such as system main relays, the contact force and the opening force between the fixed contact and the movable contact are often set to be high. Specifically, the contact force and the opening force are often set to about 10 gf to 50 gf in general DC low-voltage relays, whereas at least one of the contact force and the opening force is often set to 100 gf or more in DC high-voltage relays. The contact force in the DC high-voltage relay is high with the aim of reducing contact resistance of the contact to suppress heat generation. The contact force influences a contact area between contacts, and when the contact force is increased, contact resistance can reduce to suppress generation of Joule heat, and a reducing effect on melting and welding of contact surfaces is exhibited. On the other hand, the opening force means a return force for returning the contact to a separation position. In DC high-voltage relays, the opening force tends to be increased with an increase in contact force for smoothly performing switching operations of contacts.

The reason why interruption failure occurs due to welding of contacts at switching contacts is that the fixed contact and the movable contact are firmly fixed to each other due to welding, so that the contacts cannot be separated with a set opening force. For conventional DC low-voltage relays in which ratings and specifications are clearly specified, there is the upper limit on setting of the contact force and the opening force, and set values of the forces are not so large. Thus, in conventional DC low-voltage relays, reduction in size and weight is prioritized, and a low contact force and opening force are set, so that the problem of welding easily appears. Welding in this case is difficult to resolve with properties of the relay. Thus, it has been hoped to cope with the problem with properties of the contact material, and the contact material has been required to have strict welding resistance.

On the other hand, for DC high-voltage relays in which a high contact force and opening force are set, the fixed contact and the movable contact may be separated from each other even though these contacts are weldable to each other with heightened opening force. The present inventors considered that in a DC high-voltage relay to which the present invention is directed, it was possible to set welding resistance of a contact material more flexibly as compared to conventional DC low-voltage relays. Such an idea of allowing a certain degree of welding is unique in a field of switching contacts as well as DC high-voltage relays. DC high-voltage relays such as system main relays have become popular owing to development of high-voltage power sources in recent years, and are supposed to involve many unknown set items. Tolerance for welding resistance of the contacts is one of the items.

Considering that welding resistance can be flexibly set as described above, properties to be prioritized as the contact material of a DC high-voltage relay are two properties, that is, a stable low contact resistance property and an arc discharge property.

First, considering a method for reducing contact resistance of a Ag oxide-based contact material, reduction of the amount of oxides is effective for solving this problem. Since a metal oxide is a resistor that reduces an electrical conductivity of the overall contact material, the reduction is an effective method for reducing contact resistance. The reduction of the amount of oxides leads to deterioration of welding resistance of the contact material, but in a DC high-voltage relay in which a high contact force and a high opening force can be set, reduction of a considerable degree of welding resistance is allowable. Therefore, this method can be expected to be effective.

On the other hand, it is difficult to cope with an arc discharge property of a Ag oxide-based contact material by the amount of oxides alone. Therefore, the present inventors studied on a relation between the type of a metal oxide dispersed in a contact material and an arc discharge property. As a result, it was found that a Ag oxide-based contact material containing a Zn oxide (ZnO) as a metal oxide (hereinafter referred to as the Ag—ZnO-based contact material) possesses a suitable arc discharge property. According to the present inventors, the Ag—ZnO-based contact material exhibits a suitable arc discharge property as compared with a Ag—$SnO_2$-based contact material containing a Sn oxide conventionally regarded as suitable as a contact material for a relay from the viewpoint of welding resistance.

The Ag—ZnO-based contact material is a suitable contact material because not only the amount of oxides (the amount of ZnO) is reduced but also the Ag—ZnO-based contact material tends to exhibit a better arc discharge property. Since the reduction of the amount of oxides contributes to the reduction of contact resistance, the application of the Ag—ZnO-based contact material is useful for both improvement of an arc discharge property and reduction of contact resistance.

Based on results of these studies, the present inventors applied a Ag—ZnO-based contact material to a contact pair of a DC high-voltage relay, and conducted studies to find a suitable oxide content from the viewpoints of an arc discharge property, contact resistance and durability, resulting in achieving the present invention.

For solving the above-described problems, the present invention provides a DC high-voltage relay including at least one contact pair including a movable contact and a fixed contact. The contact pair has a contact force and/or opening force of 100 gf or more. The DC high-voltage relay has a rated voltage of 48 V or more. The movable contact and/or the fixed contact includes a Ag oxide-based contact material. Metal components in the contact material include at least one metal M essentially containing Zn, and a balance including Ag and inevitable impurity metals. The content of the metal M is 0.2% by mass or more and 8% by mass or less based on a total mass of all metal components of the contact material. The contact material has a material structure in which one or more oxides of the metal M are dispersed in a matrix including Ag or a Ag alloy.

The present inventive DC high-voltage relay and the present inventive contact material for the DC high-voltage relay will be described in detail below. In the contact material that is applied in the present invention, the content of oxides is specified based on the content of metal M which is a metal element other than Ag. The content of metal M is specified based on the total mass of all metal components forming the contact material. The contact material that is applied in the present invention is a Ag oxide-based contact material, and therefore constituent elements thereof include Ag, metal M, inevitable impurity metals, oxygen and non-metal inevitable impurity elements. However, in definition of metal components and inevitable impurity metals, elements categorized as semimetals, such as Te and Si, are treated as metals.

A. DC High-Voltage Relay of the Present Invention

The present DC high-voltage relay has a rated voltage of 48 V or more and a contact force or opening force of 100 gf or more as essential conditions. Other configurations and properties are the same as those of conventional DC high-voltage relays such as system main relays. Hereinafter, the above two essential conditions will be described, and also, configurations of the DC high-voltage relay which can be optionally provided will be described.

A-1. Rated Voltage

Relays having a rated voltage of less than 48 V, for example conventional DC low-voltage relays which cover a low voltage of 12 V to 24 V, cannot satisfy properties required for DC high-voltage relays such as system main relays. Application of the present invention to such conventional DC low-voltage relays has little significance. Hence, the present inventive DC high-voltage relay is targeted at a rated voltage of 48 V or more. The upper limit of the rated voltage of the present inventive DC high-voltage relay is preferably 3000 V. In addition, a rated current of the present inventive DC high-voltage relay is assumed to be 10 A or more and 3000 A or less.

A-2. Contact Force and Opening Force of DC High-Voltage Relay of Invention

The present invention is directed to a DC high-voltage relay having a contact force or opening force of 100 gf or more. As described above, in the DC high-voltage relay of the present invention and the contact material mounted therein, welding resistance is flexibly set based on a relationship with the contact force or the opening force of the DC high-voltage relay that is applied. The intended DC high-voltage relay is one in which the contact force or the opening force is set to 100 gf or more between the movable contact and the fixed contact. A set value of 100 gf here is assumed to be the lower limit for meeting properties required for the DC high-voltage relay. On the other hand, the upper limit of the contact force or the opening force is assumed to be 5000 gf. The contact force or the opening force is enhanced as sizes of constituent components and a relay body increase. However, it is desirable to design a relay whose contact force and opening force are as low as possible from the viewpoint of reduction in size and weight of the relay. According to the present invention, optimization of the contact material that is applied to the fixed contact and the movable contact enables setting of a DC high-voltage relay having a suitable contact force and opening force while suppressing heat generation and welding. Both the contact force and the opening force may be 100 gf or more. In addition, values of the contact force and the opening force are not required to be equal to each other.

The contact force or the opening force can be adjusted by volumes, sizes and the like of an electromagnet or a coil and an optional biasing unit which are constituent components of the relay as described later. Examples of the optional biasing unit include contact pressure springs and restoration springs for plunger-type relays, and movable springs and restoration springs for hinge-type relays.

It is noted that a contact force or an opening force can be set or measured based on a spring constant of a contact pressure spring or a restoration spring. In the measurement of a contact force or an opening force, a force applied to all contact pairs is calculated based on spring displacement caused in contacting and opening of the contacts and the spring constants. At this point, the force applied to all contact pairs is in accordance with Hooke's law ($F=kx$ (k: spring constant, x: displacement)). The thus calculated force is divided by the number of contact pairs to obtain the contact force or the opening force. For example, since a DC high-voltage relay of a double-break structure includes two contact pairs, the contact force and the opening force of each contact pair can be obtained by halving the force calculated as described above.

A-3. Structure of DC High-Voltage Relay of Invention

The DC high-voltage relay of the present invention can be characterized by the above-described rated voltage, contact force and opening force. Functions, configurations and mechanisms other than the rated voltage, the contact force and the opening force may be the same as those of conventional DC high-voltage relays. A structure and the like of the DC high-voltage relay of the present invention will be described below.

A-3-1. Overall Structure and Constitutional Components of DC High-Voltage Relay

The DC high-voltage relay generally includes a drive section which generates and transmits a drive force for moving the movable contact; and a contact section which performs switching of the DC high-voltage circuit. The drive section includes an electromagnet or a coil which generates a drive force; a transmission unit (a plunger or an armature as described later) which transmits the drive force to the contact section; and a biasing unit (a spring such as a contact pressure spring, a restoration spring, a movable spring or a restoration spring) which biases the transmission unit for closing or opening the contact pair. The contact section includes the contact pair including a fixed contact and a movable contact which is moved by the transmission unit of the drive section; and a movable terminal bonded to the movable contact and a fixed terminal bonded to the fixed contact. The DC high-voltage relay is roughly classified into a plunger type and a hinge type based on a difference in physical configuration of the contact pair.

FIG. 1 is a diagram showing an example of a structure of the plunger-type DC high-voltage relay. The plunger-type relay drives a contact section by a plunger-shaped electromagnet to perform switching of a contact pair. The contact section of the plunger-type relay includes components, which are a movable contact, a fixed contact, a movable terminal and a fixed terminal. In addition, the drive section of the plunger-type relay includes an electromagnet, a movable iron core, a fixed iron core, a plunger as a transmission unit, and a contact pressure spring and a restoration spring as biasing units. The spring such as a contact pressure spring or a restoration spring is any one selected from a compression spring and a tension spring according to a relay structure. In addition, the plunger as a transmission unit is sometimes referred to as a movable iron core, a shaft or the like. The plunger-type relay may include ancillary components such as an electromagnetic repulsion suppressing yoke, an arc-extinguishing magnet (permanent magnet), a terminal cover, an electrode and a buffer spring (buffer rubber) in addition to the above-described components. Further, the DC high-voltage relay includes wiring connected to the circuit and wiring for controlling the electromagnet.

FIG. 2 is a diagram showing an example of a structure of the hinge-type DC high-voltage relay. The hinge-type relay means a relay in which an armature of an electromagnet rotates on a support point, so that a movable contact is driven directly or indirectly to perform switching of a contact pair. The contact section of the hinge-type relay includes components, which are a movable contact, a fixed contact, a movable spring (movable terminal) and a fixed terminal (fixed spring). The drive section of the hinge-type relay includes a coil, an iron core, a yoke, an armature as a transmission unit, and a restoration spring as a biasing unit. The spring such as a restoration spring is any one selected from a compression spring and a tension spring according to a relay structure. In addition, like the hinge-type relays in FIG. 2, some hinge-type relays include a contact drive card as a transmission unit, by which the contact is driven. The hinge-type relay may include ancillary components such as an arc-extinguishing magnet (permanent magnet), a terminal cover and an electrode in addition to the above-described components. Further, the DC high-voltage relay includes wiring connected to the circuit and a terminal and wiring for controlling the electromagnet.

In the DC high-voltage relay, an arc-extinguishing magnet is disposed near the contact pair of the contact section if necessary. The arc-extinguishing magnet extends arc discharge, which occurs between the movable contact and the fixed contact in opening of these contacts, with a Lorentz force to quickly extinguish the arc. The arc-extinguishing magnet is not involved in switching operations of the contact pair, and is not an essential component. However, the arc-extinguishing magnet is used in many products because it can exhibit a marked arc-extinguishing effect in the DC high-voltage relay. A time until completion of arc extinguishment is reduced as a magnetic flux density of the arc-extinguishing magnet increases. With regard to a type of the arc-extinguishing magnet, a ferrite magnet or rare earth magnet is selected in view of a balance between production cost and an operation design balance.

The various constituent components described above are stored in a case, a body or the like for shaping an overall device. The case or the body has an airtight structure which meets necessity of protecting a relay structure against external forces and preventing ingress of contaminants, dust and the like and ingress of outside air and gas. As the airtight structure of the DC high-voltage relay, an open-air type in which gaps at terminal portions, fitting portions and the like of the case are untreated, and a resin seal type in which the gaps are sealed with a seal material such as a resin are known. In addition, a cooling gas encapsulation type is known in which cooling gas such as hydrogen gas or nitrogen gas is encapsulated in a case having an airtight structure in which gaps are sealed. For the DC high-voltage relay of the present invention, any of these airtight structures can be adopted.

A-3-2. Number of Contact Pairs

Like general relays, the DC high-voltage relay includes at least one contact pair including a movable contact and a fixed contact. The number of contact pairs can be one. However, in DC high-voltage relays such as system main relays, a double-break structure in which two contact pairs are provided is often adopted. The structure of the DC high-voltage relay shown in FIG. 1 is an example of the double-break structure. By adopting the double-break structure, a voltage is divided by two contact pairs to quickly extinguish the arc. An arc extinguishing effect is enhanced as the number of contact pairs increases. However, when there are an excessively large number of contact pairs, control becomes difficult. In addition, when a large number of contact pairs are set, much space is required. Thus, a DC high-voltage relay having a double-break structure is preferable for meeting demand for size reduction and the like.

A-3-3. Structure of Contact

In the DC high-voltage relay of the present invention, a contact material as described later is applied for at least any one of the movable contact and the fixed contact of the DC high-voltage relay. At least any one of the movable contact and the fixed contact is bonded to the movable terminal and the fixed terminal. In a specific aspect, both the movable contact and the fixed contact are formed from the later-described contact material, and bonded to respective terminals, or any one of the movable contact and the fixed contact is formed from the later-described contact material, the other contact is formed from another contact material, and the contacts are bonded to respective terminals. Alternatively, the movable contact (or fixed contact) is formed from the later-described contact material, while for the fixed contact (or movable contact), the fixed terminal (or movable terminal) can be used as such with no contact material bonded. In the aspect of forming one contact from only the terminal, the contact acts as a movable contact or a fixed contact, and forms a contact pair.

Shapes and sizes of the movable contact and the fixed contact are not particularly limited. Examples of assumed shapes of the movable contact or the fixed contact include rivet contacts, chip contacts, button contacts and disc contacts. The movable contact and the fixed contact may be single materials formed of the later-described contact material, or may be cladded to another material. For example, the later-described contact material may be cladded to a base material formed of Cu or a Cu alloy, a Fe-based alloy and the like to obtain a movable contact and a fixed contact. There is no limit on a shape of a clad material, and various shapes such as tape-shaped contacts (clad tapes), crossbar contacts, rivet contacts, chip contacts, button contacts and disc contacts can be applied.

As constituent materials of the movable terminal and the fixed terminal, Cu or Cu alloys and Fe-based alloys are used. In addition, the terminals are subjected to surface treatment such as Sn plating, Ni plating, Ag plating, Cu plating, Cr plating, Zn plating, Pt plating, Au plating, Pd plating, Rh plating, Ru plating and Ir plating if necessary.

As a method for bonding the movable contact and the fixed contact to respective terminals, a processing method such as crimping, brazing or welding can be carried out. In addition, a part or the whole of a surface of the movable terminal and/or the fixed terminal may be covered with a contact material of later-described composition by surface treatment such as sputtering to obtain a movable contact and a fixed contact.

B. Constituent Material of Movable Contact and Fixed Contact (Contact Material of Invention)

In the DC high-voltage relay of the present invention, a predetermined contact material is applied as a suitable constituent material of the movable contact and the fixed contact in view of exhibition of a high contact force and opening force.

That is, the contact material of the present invention is one for a DC high-voltage relay, the contact material being a Ag oxide-based contact material for forming at least a surface of a movable contact and/or a fixed contact of a DC high-voltage relay. The DC high-voltage relay has a rated voltage of 48 V or more, and a contact force and/or opening force of 100 gf or more at a contact pair. Metal components in the contact material include at least one metal M essentially containing Zn, and a balance including Ag and inevitable impurity metals. The content of the metal M is 0.2% by mass or more and 8% by mass or less based on a total mass of all metal components of the contact material. The contact material has a material structure in which one or more oxides of the metal M are dispersed in a matrix including Ag or a Ag alloy. A composition and a material structure of the contact material that is applied to the present invention, and a method for manufacturing the contact material will be described below.

B-1. Composition of Contact Material Applied in Invention

The contact material that is applied to the DC high-voltage relay of the present invention is a Ag oxide-based contact material having metal components including Ag, metal M and inevitable impurity metals. Metal M as a metal component is present as a constituent element of oxides dispersed in the matrix. The metal oxides are dispersed for securing mechanical strength and welding resistance of the contact material. As described above, welding resistance of the contact material is flexibly set for the DC high-voltage relay to which the present invention is directed. In other words, reduction of welding resistance of the contact material itself is allowed as long as the contact force and/or the opening force of the DC high-voltage relay is set to be high. However, this does not mean that welding resistance is unnecessary. In the present invention, a certain degree of welding resistance is necessary, and therefore oxides are formed and dispersed. Hence, in the contact material that is applied in the present invention, metal M which is an essential metal element.

In the present invention, the content of metal M is 0.2% by mass or more and 8% by mass or less based on the total mass of all metal components in the contact material. As described above, in using the Ag—ZnO-based contact material applied in the present invention, as the amount of oxides (content of metal M) is reduced, an arc discharge property can be improved, and the contact resistance can be also reduced. From this point of view, the content of metal M is preferably lower. When the content of metal M is less than 0.2% by mass, however, welding resistance may be insufficient and mechanical strength may be reduced. Owing to the reduction of mechanical strength, dislocation of the contact may occur as the number of times of switching the contact is increased, so that wear or deformation of the contact, contact failure, or locking may occur. In consideration of this point, a lower limit of the content of metal M is set to 0.2% by mass.

On the other hand, when the contact material contains metal M in a content more than 8% by mass, the contact resistance is so high that the problem of heat generation in the DC high-voltage relay is difficult to solve. Besides, it cannot be deemed that an arc discharge property is good. In the present invention, the contents of Ag, metal M and inevitable impurity metals are specified in terms of a mass concentration based on the total mass of all metal components. The total mass of all metal components is a mass obtained by subtracting a mass of components other than metal components, such as oxygen and other gas components, from a mass of the overall contact material.

In addition, when a sufficiently high contact force or opening force is set in the DC high-voltage relay, proportionate reduction of welding resistance is permissible. In such a case, the content of metal M can be set to be rather low within the above-described range. Specifically, in order to obtain suitable contact resistance, the content of metal M is preferably 0.2% by mass or more and 3% by mass or less. On the other hand, when there is a limit on design of the contact force or the opening force of the DC high-voltage relay from the viewpoint of reduction in size and weight, it is necessary that a balance between welding resistance and contact resistance be more deliberately considered. In such a case, the content of metal M is preferably 3% by mass or more and 6% by mass or less.

The content of added metal (metal M) in the contact material for the DC high-voltage relay of the present invention as described above is intentionally made lower than the content of added metal in a contact material for a conventional general relay for automobile or the like. In the contact material (Ag oxide-based contact material) that is practically used for a general relay for automobile or the like, the content of metal components other than Ag (metal M in the present invention) is generally more than 10% by mass.

The Ag oxide-based contact material that is applied in the present invention essentially contains Zn as metal M. Zn is dispersed in the form of an oxide of zinc alone (ZnO). As described above, the Ag—ZnO-based contact material is excellent in an arc discharge property, and is means for basically solving the problems of the present invention. In the present invention, Zn is an essential metal component. In the present invention, Zn alone may be contained as metal M. When Zn alone is contained as metal M, the contact material of the present invention contains Zn in an amount of 0.2% by mass or more and 8% by mass or less. As described above, when there is room or a limit in design of the contact force or the opening force, the content of Zn may be 0.2% by mass or more and 3% by mass or less, or 3% by mass or more and 6% by mass or less in some cases.

The Ag oxide-based contact material applied in the present invention can contain, as metal M, another metal while essentially containing Zn. Specifically, it can contain at least one of Sn, In, Ni, Te, Bi and Cu. When dispersed in the form of oxides, these metals tend to exhibit an action of adjusting mechanical strength, such as hardness, or an action of adjusting welding resistance of the Az-ZnO-based contact material. Besides, these are metals not impairing the effect of Zn of reducing arc duration. When the contact material contains, as metal M, at least one of Sn, In, Ni, Te, Bi and Cu in addition to Zn, the content of metal M (total content of Zn, and Sn, In, Ni, Te, Bi, and Cu) to a total mass of all metal components of the contact material is preferably 0.2% by mass or more and 8.0% by mass or less. When the content is more than 8% by mass, the problems of contact resistance and the like may occur. It is noted that any element other than Sn, In, Ni, Te, Bi and Cu can be added as metal M used in addition to Zn as long as it does not impair the properties of the contact material or contributes to improvement of the properties.

Besides, when the contact material contains at least one of Sn, In, Ni, Te, Bi and Cu in addition to Zn, a ratio ($S_{zn}/S_o$) between the content of Zn to the total mass of all the metal components of the contact material (hereinafter referred to as $S_{zn}$) and a total content of the metal(s) contained in addition to Zn to the total mass of all the metal components of the contact material (hereinafter referred to as $S_o$) can be calculated. As the ratio $S_{zn}/S_o$ has a larger value, an arc discharge property of the contact tends to be better. It is Zn that has the effect of improving an arc discharge property. Sn and the like contribute to improvement of welding resistance of the contact material, but does not contribute to improvement of an arc discharge property.

The metal components of the contact material of the present invention include the above-described metal M essentially containing Zn, a balance being Ag and inevitable impurity metals. Examples of the inevitable impurity metals include Ca, Pb, Pd, Al, Mo, Mg, La, Mg, Li, Ge, W, Na, Zr, Nb, Y, Ta, Mn, Ti, Co, Cr, Cd, K and Si. The content of each of these inevitable impurity metals to the total mass of all the metal components of the contact material is preferably 0% by mass or more and, for example, 1% by mass or less as long as the properties are not impaired. The content of each inevitable impurity metal is more preferably 0.8% by mass or less, further preferably 0.5% by mass or less, and particularly preferably 0.2% by mass or less.

As described above, the contact material that is applied in the present invention is a Ag oxide-based contact material, and contains oxygen and nonmetal impurity elements in addition to the metal components. The content of oxygen in the contact material of the present invention is 0.025% by mass or more and 2% by mass or less based on the total mass of the contact material. In addition, examples of nonmetal inevitable impurity elements include C, S and P. Contents of these inevitable impurity elements are each preferably 0% by mass or more and 0.1% by mass or less based on the total mass of the contact material. Further, the inevitable impurity metal and the nonmetal inevitable impurity element may form intermetallic compound. The intermetallic compound is assumed to be WC, TiC or the like. Contents of these intermetallic compounds are each preferably 0% by mass or more and 1% by mass or less based on the total mass of the contact material.

B-2. Material Structure of Contact Material Applied in the Present Invention

The contact material that is applied to the DC high-voltage relay of the present invention is a Ag oxide-based contact material. The material structure is basically the same as conventional Ag oxide-based contact materials. That is, the contact material has a material structure in which at least one oxide of the metal M is dispersed in a matrix including Ag and/or a Ag alloy. The matrix includes Ag (pure Ag) or a Ag alloy, or Ag and a Ag alloy. The Ag alloy is an alloy of Ag and added metal M or inevitable impurity metals. The Ag alloy is not limited to a single-phase Ag alloy of one composition, and may include a plurality of Ag alloys different in amount of metal M etc. dissolved. This shows that the contact material is manufactured by internal oxidation of an alloy of Ag and metal M, a composition and a structure of the Ag alloy can vary depending on a degree of the oxidation. Thus, the matrix may contain metal M. A concentration (average concentration) of metal M in the matrix is preferably 4% by mass or less, but the matrix can function as a matrix of the contact material when the upper limit of the concentration is less than 8% by mass, for example, 7% by mass or less. On the other hand, a configuration of oxide particles dispersed in the matrix is based on the range of metal M, and at least one of oxides such as ZnO and $SnO_2$ is dispersed.

As described above, oxides to be dispersed are defined as Zn oxides and the like in the present invention, and the content (content of metal M) is intentionally reduced as compared with that in a conventional Ag oxide-based contact material, and thus, a good arc discharge property and stable low contact resistance are obtained. However, the present invention has no intention of ignoring welding resistance and mechanical strength. Thus, in the present invention, by making oxide particles finer while reducing the amount of oxides, the number of oxides is increased to reduce a distance between particles, leading to enhancement of a dispersion effect. In this way, minimum material strength and the like required for the DC high-voltage relay are secured.

In the contact material applied in the present invention, the average particle size of oxides dispersed in the matrix is 0.01 μm or more and 0.4 μm or less. As described above, the content of oxides is reduced in the present invention. Therefore, when the average particle size of oxides is coarse and beyond 0.4 μm, the distance between particles increases, so that a dispersion effect is suppressed. The average particle size of oxides is more preferably 0.3 μm or less. The average particle size of oxides is preferably smaller, but it is difficult to set to less than 0.01 μm, and hence the lower limit is 0.01 μm. In the present invention, the particle size of an oxide particle is an equivalent circular diameter (areal equivalent circular diameter), which is the diameter of a true circle having an area equivalent to the area of the particle.

In the contact material that is applied in the present invention, it is preferable that the particle sizes of dispersed oxide particles are uniform. As a criterion of this requirement, the particle size corresponding to 90% in terms of the cumulative number of particles ($D_{90}$) in a particle size distribution measured for all oxide particles by observing an arbitrary cross-section is preferably 0.8 μm or less.

In addition, in the contact material that is applied in the present invention, observation of the material structure shows that the area of oxides is relatively small because the content of the oxides is reduced. Specifically, observation of an arbitrary cross-section shows that the area ratio of oxides on the cross-section is 0.1% or more and 20% or less. The area ratio can be measured by cutting the contact material in an arbitrary direction, and observing the thus-obtained cross-section with a microscope (preferably an electron microscope) at a magnification of 1000 to 10000 times. A ratio of the total area of oxide particles in the visual field to the area of the observation visual field which is defined as the total area of the contact material may be calculated. The average particle size can be calculated in this observation. In addition, image processing software can be optionally used.

Material strength of the contact material applied in the present invention is preferably 40 Hv or more and 300 Hv or less in terms of Vickers hardness. When the material strength is less than 40 Hv, switching of the contact pair may cause excessive wear or deformation because the strength is excessively low. In addition, a hard material having strength more than 300 Hv might increase contact resistance. The Vickers hardness of the contact material is more preferably 50 Hv or more and 200 Hv or less.

B-3. Method for Manufacturing Contact Material Applied in the Present Invention

A method for manufacturing a Ag oxide-based contact material that is applied to the DC high-voltage relay of the present invention will now be described. A method and conditions for manufacturing the contact material of the present invention are not especially limited, and the contact material can be manufactured preferably by an internal oxidation method, a powder metallurgy method, or a combination of the internal oxidation method and the powder metallurgy method.

B-3-1. Internal Oxidation Method

In the internal oxidation method, an alloy of Ag and metal M (Ag-M alloy) is produced and subjected to an internal oxidation treatment to obtain a contact material. Specific examples of the alloy produced here include not only Ag—Zn alloys but also, when Sn or the like is contained as metal M, Ag—Zn—Sn alloys, Ag—Zn—In alloys, Ag—Zn—Ni alloys, Ag—Zn—Te alloys, Ag—Zn—Bi alloys, Ag—Zn—Cu alloys and the like. It is noted that a total concentration of metal M (Zn, Sn, In, Ti, Te, Bi, and Cu) is 0.2 to 8% by mass, with a balance being Ag. These alloys can be manufactured by a known melting and casting method. A molten alloy adjusted to a desired composition is manufactured, and the resultant is cast to obtain an alloy.

The alloy of Ag and metal M is internally oxidized, so that metal M is turned into an oxide to obtain a contact material. As conditions for the internal oxidation of the Ag-M alloy, an oxygen partial pressure is preferably equal to or higher than atmospheric pressure and 0.9 MPa or less, and a temperature is preferably 300° C. or higher and 900° C. or lower. When the temperature is lower than 300° C., internal oxidation is difficult to proceed, and it is concerned that oxide particles may not be sufficiently dispersed in the alloy. On the other hand, when the oxygen partial pressure is more than 0.9 MPa, oxides may be excessively finely dispersed to deteriorate processability. When the temperature is higher than 900° C., a part or the whole of the alloy might melt before being internally oxidized depending on the alloy composition. In addition, for optimization of the particle size and a dispersion state of oxide particles, the oxygen partial pressure and the heating temperature can be appropriately adjusted within the above-described ranges in consideration of the type and the content of metal M to be added. A treatment time of the internal oxidation is preferably 24 hours or more.

In manufacturing of the contact material by the internal oxidation method, an alloy ingot is appropriately molded and processed, subjected to internal oxidation treatment, and appropriately molded and processed to obtain a contact material. Alternatively, an alloy ingot is formed into pieces (small pieces or chips) by crushing, cutting or the like, and the pieces are subjected to internal oxidation treatment under the above-described conditions, collected, and compression-molded into billets for processing. The manufactured billets can be subjected to appropriate processing such as extrusion processing and drawing processing, and this enables formation of a contact material having a predetermined shape and size.

B-3-2. Powder Metallurgy Method

In the powder metallurgy method, Ag powder and powder of oxides of metal M (ZnO powder, $SnO_2$ powder and the like) are mixed and compressed, and then sintered to manufacture a contact material. It is preferable that the Ag powder and the oxide powder have an average particle size of 0.5 μm or more and 100 μm or less. The temperature for sintering the powder is preferably 700° C. or higher and 850° C. or lower.

In the manufacture of the contact material by the powder metallurgy method, it is preferable, in the sintering step, to suppress coarsening of oxides otherwise caused by excessive sintering. For this purpose, it is preferable not only to adjust the sintering temperature but also to perform sintering in a comparatively short time (of 6 hours or less) a plurality of times and perform compressing after the sintering. The compression is preferably performed by cold compression. At this point, cold compression and hot compression can be combined. Besides, a load employed in the compression can be adjusted in each time of performing the compression. For example, assuming that the sintering and cold compression are to be performed a plurality of times, the load employed in the cold compression can be set to about twice or three times of the load employed in the cold compression performed after the previous sintering. Through such a sintering step, a contact material in which oxides having a suitable particle size are dispersed can be obtained.

Although the contact material used in the present invention is manufactured basically by the internal oxidation method or the powder metallurgy method, the internal oxidation method and the powder metallurgy method can be combined. In this case, powder including an alloy of Ag and metal M (Ag-M alloy powder) is manufactured, and the alloy powder is subjected to internal oxidation treatment, and then compressed and sintered to manufacture a contact material. In the manufacturing method, the Ag-M alloy powder refers to powder including a Ag alloy having the same composition as described above (Ag—Zn alloy, Ag—Zn—Sn alloy, Ag—Zn—In alloy, Ag—Zn—Ni alloy, Ag—Zn—Te alloy, Ag—Zn—Bi alloy, Ag—Zn—Cu alloy or the like). It is preferable that the alloy powder has an average particle size of 100 μm or more and 3.0 mm or less. The conditions for internal oxidation of the Ag alloy powder are preferably the same conditions as described above. The temperature for sintering the Ag alloy powder is preferably 700° C. or higher and 900° C. or lower.

Advantageous Effects of the Invention

As described so far, a DC high-voltage relay of the present invention can perform reliable on/off control while coping with problems of arc discharge and heat generation in a contact pair. This effect is attributed to application of a Ag—Zn-based contact material containing Zn as an essential metal to be added (metal M) to a contact material forming a movable contact and/or a fixed contact in consideration of high contact force and opening force set in the DC high-voltage relay.

In the Ag—Zn-based contact material applied to the DC high-voltage relay of the present invention, the content of oxides dispersed therein is intentionally reduced. Thus, the problem of heat generation of the DC high-voltage relay is solved by exhibiting a stable low contact resistance property with a good arc discharge property realized. In the present invention, a contact pair free from interruption failure caused by welding is formed by setting a minimum amount of oxides while utilizing the contact force and the opening force of the DC high-voltage relay.

According to the present invention, since the contact material exhibiting an excellent arc discharge property is mounted, even if a magnet having a magnetic force weaker than a conventional one is used, arc-extinguish performance equivalent to that of conventional design can be expected to be secured. Specifically, in a case where a rare earth element magnet such as a neodymium magnet is necessary in conventional design, possibility of replacement with a ferrite magnet having a weaker magnetic force is suggested. As characteristics of a ferrite magnet, although the magnetic force is weaker than that of a rare earth element magnet, a rare earth element is not contained in a raw material but inexpensive and easily available iron oxide is contained as a principal component, and in addition, heat resistance is excellent as compared with that of a rare earth element magnet. Accordingly, when a rare earth element magnet is replaced with a ferrite magnet based on the present invention, very useful effects can be obtained in reducing cost of a DC high-voltage relay and avoiding rare earth procurement risk. Besides, in the present invention, equivalent arc-extinguish performance can be expected to be secured with a weaker magnetic force than in conventional technique, and even if the type of magnet is not changed, the size can be reduced. The size of the relay can be reduced correspondingly to an unnecessary extra space for the magnet.

The present invention having the above-described effects is predicted to have a considerably great impact on industries including automotive industry. For example, the world markets of HVs, PHVs and EVs using high-voltage batteries is predicted to grow exponentially in future. Specifically, total annual sales of HVs, PHVs and EVs are about 3.24 million in 2017, and are reported to be greatly increased to exceed 27 million in 2035. The present invention having the effects of cost reduction and size reduction of DC high-voltage relays mounted on the thus rapidly growing car products makes a contribution to development of these industries.

The present invention is useful also from the viewpoints of suppression of usage of rare earth elements and resource conservation. Rare earth elements are indispensable to industrial products of the recent high technology industries, for example, manufacture of a wide range of products such as rare earth magnets, glass substrates for hard discs, abrasives for liquid panel displays, and catalysts for cars. In particular, neodymium is used in many uses such as a neodymium magnet (a neodymium magnet contains neodymium in a large amount of about 28%), an FCC catalyst, a glass additive, a nickel-hydrogen battery, and a ceramic capacitor. A demand for rare earth elements is regarded to continuously expand in future, and depletion of rare earth elements is a global issue.

The rare earth reserves in a specific country account for 36% of world's rare earth. In addition, about 80% (105,000 tons) of total ore production in the world (130,000 tons: 2017) is produced in this country. In the country, a domestic demand for rare earth elements is expanding, and the domestic demand of the country has occupied a large part in the whole world consumption since 2004. It has been reported that if the country continues the development of ore deposits at the current pace, the resource depletion might occur in 15 to 20 years.

On the other hand, a demand for rare earth elements in Japan is about 18,000 tons, and in particular, demands for didymium (a mixture of neodymium and praseodymium) and neodymium are 4,400 tons owing to growth of magnets for cars (2017). In domestic industries, procurement of rare earth elements depends mostly on imports, and about 60% is imported from the country. In recent years, the country has tightened regulations on rare earth elements, and hence the supply has been decreased, which has caused international price soaring.

In addition, serious environmental problems, such as water pollution and soil pollution caused by pollution with strong acid (ammonium sulfate) occurring in mining and purifying process of rare earth elements, and leakage of radioactive substances accompanying rare earth elements, have arisen in production areas of rare earth elements.

In this manner, the problems surrounding rare earth elements include, in addition to the problem of resource depletion, increase of quantitative and cost risks in procurement of rare earth raw materials in the domestic industries, and the environmental problems occurring in the production areas of rare earth. Therefore, reduction of the usage of rare earth is an urgent and significant theme.

Against this background, various developments have been made for reducing usage of rare earth in private companies such as car manufacturers and material manufactures in Japan. Examples include a magnet for an EV drive motor with which usage of neodymium can be reduced by 50% at most, and an EV drive motor using a neodymium magnetic free of heavy rare earth elements such as dysprosium. Some of these aims to be practically used within 10 years, and some are already released to the market. Many domestic industries are advancing development considering reduction of the usage of rare earth as the urgent and significant theme, and the present invention is a significant invention expected to contribute to the reduction of the usage of rare earth similarly to these efforts.

DESCRIPTION OF EMBODIMENTS

Figure 1:
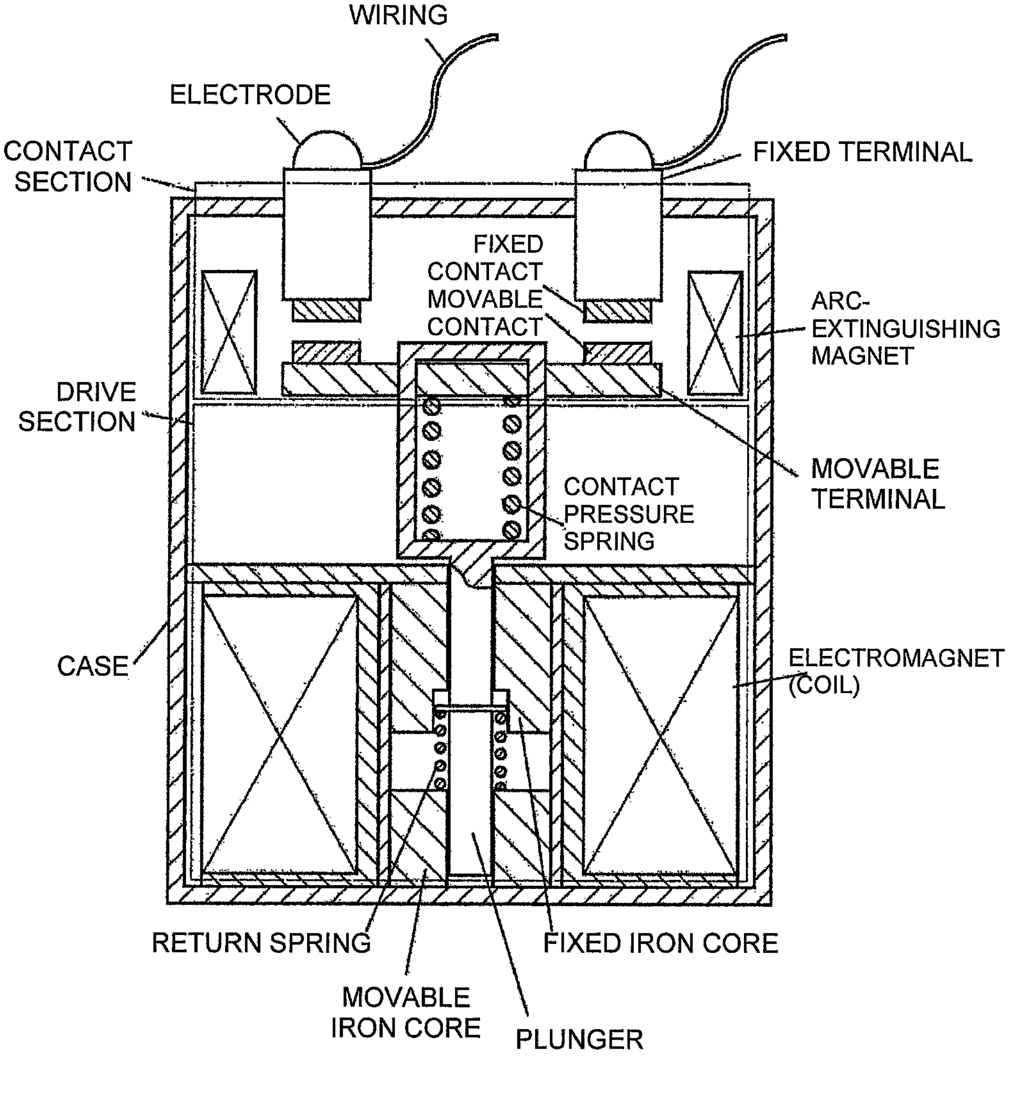
FIG. 1 is a diagram showing an example of a configuration (double-break structure) of a plunger-type DC high-voltage relay.
Figure 2:
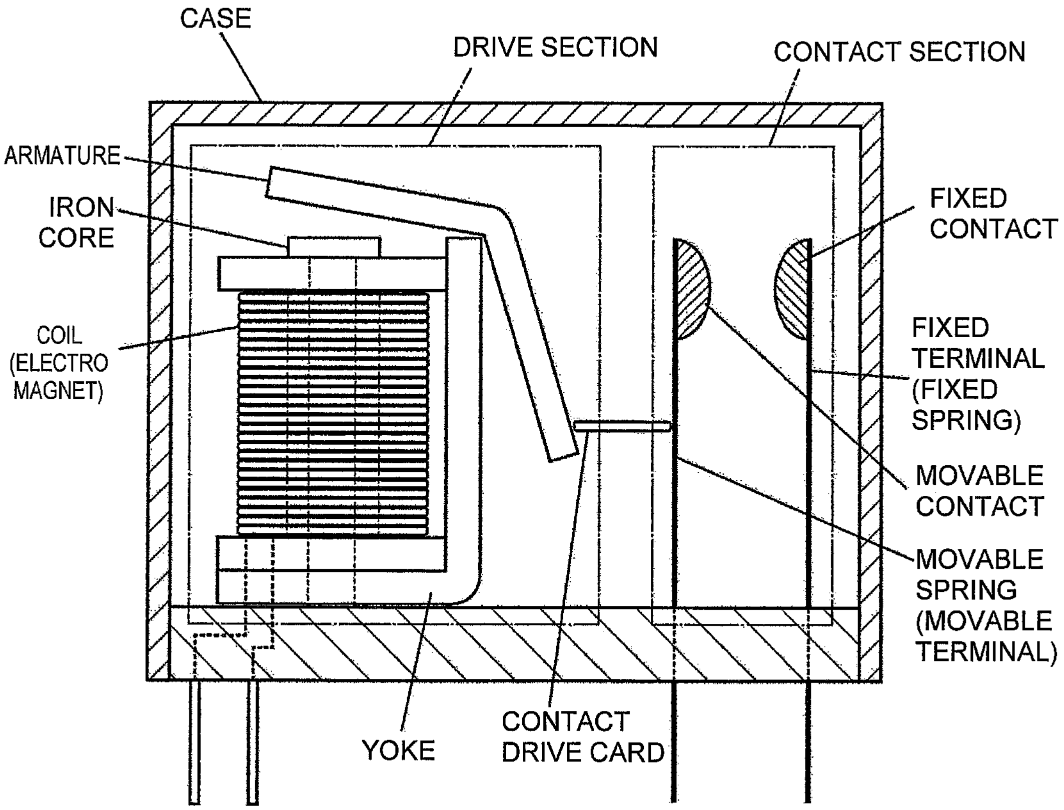
FIG. 2 is a diagram showing an example of a configuration of a hinge-type DC high-voltage relay.

Hereinafter, an embodiment of the present invention will be described. In this embodiment, not only Ag—ZnO-based contact materials in which Zn alone was added as metal M but also Ag—ZnO-based contact materials in which Sn was added in addition to Zn were manufactured, and structure observation and hardness measurement were performed. The manufactured Ag oxide-based contact materials were incorporated as contacts in a DC high-voltage relay, and the properties of the contact materials were evaluated. Ag oxide-based contact materials in which Sn and the like were added without containing Zn were also manufactured and evaluated as comparative examples.

First Embodiment: In this embodiment, various Ag oxide-based contact materials were manufactured by an internal oxidation method and a powder metallurgy method, material properties were examined, DC high-voltage relays (contact force/opening force: 75 gf/125 gf) were then manufactured to check an operation (interruption durability) and measure an arc discharge property and contact resistance.

In the manufacture of the contact material by the internal oxidation method, ingots of Ag alloys having various compositions were cast by melt casting in a high-frequency melting furnace. After the melt casting, each ingot was formed into pieces of 3 mm or less, and the pieces were internally oxidized. In the internal oxidation, the oxygen partial pressure and the heating temperature were adjusted in ranges of 0.2 to 0.9 MPa and 500° C. to 900° C., respectively. Next, the internally oxidized pieces were collected and compression-molded to form a billet having a diameter of 50 mm. The billets were subjected to hot extrusion processing, and subsequently subjected to drawing processing to obtain a wire rod having a diameter of 2.3 mm, and a rivet-type contact material was manufactured with a header machine.

In manufacturing of the contact material by the powder metallurgy method, Ag powder and oxide powder (each having an average particle size of 0.5 to 100 μm) were mixed, and compression-molded to form billets having a diameter of 50 mm.

The billet was sintered, and then subjected to cold compression processing twice and sintering processing twice, and subsequently to hot compression processing to obtain a sintered body. In the sintering step performed a plurality of times, the heating temperature was set to 800° C. to 850° C. for performing heating in this temperature range for the sintering. Besides, in the cold compression processing performed after the sintering, a load employed in the second processing was set to be double of that in the first processing. Thereafter, the sintered body was subjected to hot extrusion processing, and subsequently subjected to drawing processing to obtain a wire rod having a diameter of 2.3 mm, and a rivet-type contact material was manufactured therefrom with a header machine.

In this embodiment, two rivet-type contact materials, with one for a movable contact and the other for a fixed contact, were manufactured. The size of a head portion of the movable contact was set to a diameter of 3.15 mm and a height of 0.75 mm, and the size of a head portion of the fixed contact was set to a diameter of 3.3 mm and a height of 1.0 mm.

[Hardness Measurement of Contact Material]

In a process for manufacturing the contact materials, a wire sample was cut out from the wire rod subjected to drawing processing and annealed (temperature: 700° C.), and the hardness was measured. For hardness measurement, the sample was embedded in a resin, exposure polishing was performed so as to expose a lateral cross-section (cross-section in a short side direction), and the hardness was measured with a Vickers hardness meter (HMV-G21ST manufactured by Shimadzu Corporation). For measurement conditions, the load was set to 200 gf, measurement was performed at five positions, and an average for the measurements was defined as a hardness value.

Tables 1 and 2 show the compositions and the hardness values of the contact materials of Examples (Examples 1 to 49) and Comparative Examples (Comparative Examples 1 to 23) manufactured in this embodiment. In this embodiment, a contact material containing pure Ag not containing oxide particles was also manufactured and evaluated (Comparative Example 23). This Ag contact was manufactured by hot-extruding the melted and cast billets and performing processing etc. The hardness of the Ag contact was measured with a sample cut out after the Ag wire rod was annealed (temperature: 700° C.), and then subjected to drawing processing at a processing rate of 4.2%.

[Structure Observation of Contact Material]

Next, the structures of the contact materials were observed. A transverse section of a sample embedded in a resin as in hardness measurement was observed with an electron microscope (SEM) (magnification of 5000 times). The formed SEM image was subjected to image processing by the use of particle analysis software. In the image processing, the total area (area ratio to the visual field area), the average particle size and the particle size distribution of oxides were measured and analyzed as a dispersion state of the oxides in the contact material. For the analysis, Particle Analysis System AZtecFeature made by Oxford Instruments was used. The particle size was determined in terms of an equivalent circular diameter (areal equivalent circular diameter). Based on the area f of each oxide particle, the particle size of the oxide particle was calculated from an equivalent circular diameter calculation formula ($(4f/\pi)^{1/2}$), and the average and the standard deviation a of the particle sizes were determined.

Tables 1 and 2 show the compositions, the hardness values and measurement results of dispersion states of the oxide particles of the contact materials of Examples (Examples 1 to 49) and Comparative Examples (Comparative Examples 1 to 23) manufactured in this embodiment. From these tables, it is confirmed that fine oxide particles are dispersed in a Ag matrix in the contact material of each example.

TABLE 1

| | Composition (mass %)*[1] | | | | | | | | | Content of metal M | Dispersion state of oxide particles: Area ratio | Average particle size | Particle size standard deviation δ | Hardness | Manufacture |
|---|---|---|---|---|---|---|---|---|---|---|---|---|---|---|---|
| | Ag | Zn | Sn | In | Ni | Te | Bi | Cu | Mg | (mass %) | (%) | (μm) | (μm) | (Hv) | method |
| Ex. 1 | Balance | 0.20 | — | — | — | — | — | — | — | 0.20 | 0.39 | 0.04 | 0.01 | 74 | Internal oxidation |
| Ex. 2 | | 1.00 | — | — | — | — | — | — | — | 1.00 | 2.26 | 0.05 | 0.02 | 94 | Internal oxidation |
| Ex. 3 | | 2.50 | — | — | — | — | — | — | — | 2.50 | 6.89 | 0.06 | 0.06 | 89 | Internal oxidation |
| Ex. 4 | | 5.00 | — | — | — | — | — | — | — | 5.00 | 11.98 | 0.08 | 0.11 | 77 | Internal oxidation |
| Ex. 5 | | 6.00 | — | — | — | — | — | — | — | 6.00 | 15.19 | 0.10 | 0.15 | 86 | Internal oxidation |
| Ex. 6 | | 6.50 | — | — | — | — | — | — | — | 6.50 | 14.90 | 0.29 | 0.27 | 86 | Powder metallurgy |
| Ex. 7 | | 8.00 | — | — | — | — | — | — | — | 8.00 | 19.48 | 0.11 | 0.13 | 90 | Internal oxidation |
| Ex. 8 | | 0.60 | 0.40 | — | — | — | — | — | — | 1.00 | 2.06 | 0.07 | 0.04 | 119 | Internal oxidation |
| Ex. 9 | | 2.40 | 1.60 | — | — | — | — | — | — | 4.00 | 8.75 | 0.05 | 0.02 | 138 | Internal oxidation |
| Ex. 10 | | 4.80 | 3.20 | — | — | — | — | — | — | 8.00 | 17.64 | 0.18 | 0.17 | 79 | Powder metallurgy |
| Ex. 11 | | 0.20 | — | — | — | — | — | — | — | 0.20 | 0.74 | 0.15 | 0.12 | 44 | Powder metallurgy |
| Ex. 12 | | 3.00 | — | — | — | — | — | — | — | 3.00 | 7.53 | 0.06 | 0.04 | 101 | Internal oxidation |
| Ex. 13 | | 0.33 | 0.67 | — | — | — | — | — | — | 1.00 | 1.15 | 0.05 | 0.02 | 109 | Internal oxidation |
| Ex. 14 | | 1.50 | 0.50 | — | — | — | — | — | — | 2.00 | 3.10 | 0.07 | 0.05 | 130 | Internal oxidation |
| Ex. 15 | | 1.00 | 1.00 | — | — | — | — | — | — | 2.00 | 4.91 | 0.07 | 0.04 | 101 | Internal oxidation |
| Ex. 16 | | 0.30 | 1.70 | — | — | — | — | — | — | 2.00 | 2.02 | 0.05 | 0.03 | 117 | Internal oxidation |
| Ex. 17 | | 3.90 | 0.10 | — | — | — | — | — | — | 4.00 | 8.04 | 0.05 | 0.02 | 126 | Internal oxidation |
| Ex. 18 | | 3.00 | 1.00 | — | — | — | — | — | — | 4.00 | 9.19 | 0.05 | 0.02 | 144 | Internal oxidation |
| Ex. 19 | | 2.00 | 2.00 | — | — | — | — | — | — | 4.00 | 9.04 | 0.19 | 0.15 | 69 | Powder metallurgy |
| Ex. 20 | | 1.40 | 2.60 | — | — | — | — | — | — | 4.00 | 8.93 | 0.09 | 0.05 | 115 | Internal oxidation |
| Ex. 21 | | 0.60 | 3.40 | — | — | — | — | — | — | 4.00 | 8.51 | 0.07 | 0.04 | 110 | Internal oxidation |
| Ex. 22 | | 6.00 | 2.00 | — | — | — | — | — | — | 8.00 | 18.80 | 0.22 | 0.20 | 77 | Powder metallurgy |
| Ex. 23 | | 4.00 | 4.00 | — | — | — | — | — | — | 8.00 | 19.08 | 0.17 | 0.15 | 87 | Powder metallurgy |
| Ex. 24 | | 2.70 | 5.30 | — | — | — | — | — | — | 8.00 | 15.03 | 0.15 | 0.14 | 85 | Powder metallurgy |
| Ex. 25 | | 1.00 | 7.00 | — | — | — | — | — | — | 8.00 | 17.90 | 0.15 | 0.11 | 92 | Powder metallurgy |
| Ex. 26 | | 0.30 | 7.70 | — | — | — | — | — | — | 8.00 | 15.28 | 0.14 | 0.09 | 91 | Powder metallurgy |
| Ex. 27 | | 0.50 | — | 0.10 | — | — | — | — | — | 0.60 | 1.68 | 0.07 | 0.08 | 106 | Internal oxidation |
| Ex. 28 | | 1.50 | — | 0.50 | — | — | — | — | — | 2.00 | 4.11 | 0.07 | 0.06 | 134 | Internal oxidation |
| Ex. 29 | | 1.00 | — | 1.00 | — | — | — | — | — | 2.00 | 3.39 | 0.09 | 0.10 | 144 | Internal oxidation |
| Ex. 30 | | 3.90 | — | 0.10 | — | — | — | — | — | 4.00 | 11.14 | 0.06 | 0.03 | 120 | Internal oxidation |
| Ex. 31 | | 3.00 | — | 1.00 | — | — | — | — | — | 4.00 | 11.34 | 0.06 | 0.02 | 118 | Internal oxidation |
| Ex. 32 | | 2.00 | — | 2.00 | — | — | — | — | — | 4.00 | 8.99 | 0.05 | 0.02 | 144 | Internal oxidation |
| Ex. 33 | | 6.00 | — | 2.00 | — | — | — | — | — | 8.00 | 19.93 | 0.20 | 0.19 | 79 | Powder metallurgy |
| Ex. 34 | | 4.00 | — | 4.00 | — | — | — | — | — | 8.00 | 17.55 | 0.25 | 0.24 | 78 | Powder metallurgy |
| Ex. 35 | | 4.00 | — | 4.00 | — | — | — | — | — | 8.00 | 17.74 | 0.18 | 0.18 | 78 | Powder metallurgy |
| Ex. 36 | | 2.00 | — | 6.00 | — | — | — | — | — | 8.00 | 18.07 | 0.17 | 0.19 | 76 | Powder metallurgy |
| Ex. 37 | | 0.50 | — | — | 0.50 | — | — | — | — | 1.00 | 3.76 | 0.10 | 0.11 | 51 | Powder metallurgy |
| Ex. 38 | | 7.90 | — | — | 0.10 | — | — | — | — | 8.00 | 17.64 | 0.09 | 0.13 | 92 | Internal oxidation |
| Ex. 39 | | 6.80 | — | — | 1.20 | — | — | — | — | 8.00 | 17.11 | 0.23 | 0.21 | 74 | Powder metallurgy |
| Ex. 40 | | 0.50 | — | — | — | 0.50 | — | — | — | 1.00 | 0.99 | 0.04 | 0.03 | 60 | Internal oxidation |
| Ex. 41 | | 7.90 | — | — | — | 0.10 | — | — | — | 8.00 | 18.63 | 0.08 | 0.09 | 111 | Internal oxidation |

TABLE 1-continued

| | Composition (mass %)*[1] | | | | | | | | | Content of metal M | Dispersion state of oxide particles | | | Hardness | Manufacture |
|---|---|---|---|---|---|---|---|---|---|---|---|---|---|---|---|
| | | | | | | | | | | | Area ratio | Average particle size | Particle size standard deviation δ | | |
| | Ag | Zn | Sn | In | Ni | Te | Bi | Cu | Mg | (mass %) | (%) | (μm) | (μm) | (Hv) | method |
| Ex. 42 | | 0.50 | — | — | — | — | 0.50 | — | — | 1.00 | 1.73 | 0.07 | 0.05 | 53 | Internal oxidation |
| Ex. 43 | | 7.90 | — | — | — | — | 0.10 | — | — | 8.00 | 17.61 | 0.33 | 0.47 | 77 | Internal oxidation |
| Ex. 44 | | 5.70 | 0.10 | 0.10 | 0.10 | — | — | — | — | 6.00 | 6.82 | 0.14 | 0.08 | 40 | Internal oxidation |
| Ex. 45 | | 5.60 | 0.10 | 0.10 | 0.10 | 0.10 | — | — | — | 6.00 | 13.93 | 0.06 | 0.05 | 116 | Internal oxidation |
| Ex. 46 | | 5.80 | 0.10 | — | — | — | 0.10 | — | — | 6.00 | 13.70 | 0.07 | 0.06 | 96 | Internal oxidation |
| Ex. 47 | | 4.50 | — | — | — | 1.50 | — | — | — | 6.00 | 12.66 | 0.07 | 0.08 | 102 | Internal oxidation |
| Ex. 48 | | 3.40 | — | — | — | — | — | 3.40 | — | 6.80 | 14.17 | 0.09 | 0.14 | 96 | Internal oxidation |
| Ex. 49 | | 6.00 | — | — | — | — | — | — | — | 6.00 | 13.61 | 0.25 | 0.25 | 66 | Powder metallurgy |

*[1]Concentration based on all metal components.

TABLE 2

| | Composition (mass %)*[1] | | | | | | | | | Content of metal M | Dispersion state of oxide particles | | | Hardness | Manufacture |
|---|---|---|---|---|---|---|---|---|---|---|---|---|---|---|---|
| | | | | | | | | | | | Area ratio | Average particle size | Particle size standard deviation δ | | |
| | Ag | Zn | Sn | In | Ni | Te | Bi | Cu | Mg | (mass %) | (%) | (μm) | (μm) | (Hv) | method |
| Comp. Ex. 1 | Balance | — | 3.60 | 1.30 | 0.10 | — | — | — | — | 5.00 | 6.49 | 0.04 | 0.04 | 106 | Internal oxidation |
| Comp. Ex. 2 | | — | 3.30 | 1.30 | 0.10 | 0.30 | — | — | — | 5.00 | 8.17 | 0.06 | 0.06 | 95 | Internal oxidation |
| Comp. Ex. 3 | | — | 5.90 | 1.90 | 0.20 | — | — | — | — | 8.00 | 14.52 | 0.16 | 0.10 | 110 | Internal oxidation |
| Comp. Ex. 4 | | — | 6.40 | 2.50 | 0.10 | 1.00 | — | — | — | 10.00 | 19.10 | 0.14 | 0.18 | 91 | Internal oxidation |
| Comp. Ex. 5 | | 10.80 | — | — | — | — | — | — | — | 10.80 | 23.78 | 0.16 | 0.21 | 86 | Internal oxidation |
| Comp. Ex. 6 | | 0.10 | — | — | — | — | — | — | — | 0.10 | 0.24 | 0.05 | 0.03 | 60 | Internal oxidation |
| Comp. Ex. 7 | | 0.10 | — | — | — | — | — | — | — | 0.10 | 0.50 | 0.15 | 0.13 | 43 | Powder metallurgy |
| Comp. Ex. 8 | | 11.00 | — | — | — | — | — | — | — | 11.00 | 22.41 | 0.32 | 0.27 | 80 | Powder metallurgy |
| Comp. Ex. 9 | | 0.30 | 9.00 | — | — | — | — | — | — | 9.30 | 17.25 | 0.14 | 0.09 | 100 | Powder metallurgy |
| Comp. Ex. 10 | | 0.50 | — | — | — | 1.50 | — | — | — | 2.00 | 13.93 | 1.27 | 2.27 | 107 | Internal oxidation |
| Comp. Ex. 11 | | 3.50 | — | — | — | 2.50 | — | — | — | 6.00 | 17.56 | 0.56 | 1.40 | 48 | Powder metallurgy |
| Comp. Ex. 12 | | 0.50 | — | — | — | — | 1.50 | — | — | 2.00 | 8.16 | 0.52 | 0.67 | 46 | Powder metallurgy |
| Comp. Ex. 13 | | 4.50 | — | — | — | — | 1.50 | — | — | 6.00 | 18.48 | 0.53 | 0.86 | 54 | Internal oxidation |
| Comp. Ex. 14 | | 3.50 | — | — | — | — | 2.50 | — | — | 6.00 | 17.84 | 0.62 | 0.86 | 51 | Powder metallurgy |
| Comp. Ex. 15 | | — | 0.20 | — | — | — | — | — | — | 0.20 | 0.09 | 0.04 | 0.07 | 81 | Internal oxidation |
| Comp. Ex. 16 | | — | 1.00 | — | — | — | — | — | — | 1.00 | 0.41 | 0.05 | 0.05 | 100 | Internal oxidation |
| Comp. Ex. 17 | | — | 3.00 | — | — | — | — | — | — | 3.00 | 7.54 | 0.07 | 0.03 | 108 | Internal oxidation |
| Comp. Ex. 18 | | — | 6.00 | — | — | — | — | — | — | 6.00 | 12.59 | 0.09 | 0.06 | 117 | Internal oxidation |
| Comp. Ex. 19 | | — | 5.00 | 1.00 | — | — | — | — | — | 6.00 | 14.27 | 0.09 | 0.09 | 114 | Internal oxidation |
| Comp. Ex. 20 | | — | 5.90 | — | — | — | 0.10 | — | — | 6.00 | 10.83 | 0.09 | 0.07 | 114 | Internal oxidation |
| Comp. Ex. 21 | | — | 8.00 | — | — | — | — | — | — | 8.00 | 15.54 | 0.17 | 0.14 | 100 | Powder metallurgy |

TABLE 2-continued

| | Composition (mass %)*[1] | | | | | | | | | Content of metal M | Dispersion state of oxide particles: Area ratio | Average particle size | Particle size standard deviation δ | Hardness | Manufacture |
|---|---|---|---|---|---|---|---|---|---|---|---|---|---|---|---|
| | Ag | Zn | Sn | In | Ni | Te | Bi | Cu | Mg | (mass %) | (%) | (μm) | (μm) | (Hv) | method |
| Comp. Ex. 22 | | 6.00 | — | — | — | — | — | — | — | 6.00 | 19.06 | 0.44 | 0.53 | 64 | Powder metallurgy |
| Comp. Ex. 23 | 100 | — | — | — | — | — | — | — | — | 0.00 | — | — | — | 50 | Melting |

*[1]Concentration based on all metal components.

[Evaluation of Interruption Durability of DC High-Voltage Relay]

DC high-voltage relays in which the contact materials of the examples and the comparative examples were respectively incorporated were manufactured, and the interruption durability of these relays were checked. Here, relays of the same type as in FIG. 1, which had a double-break structure, were prepared, and rivet-type contacts formed of the contact materials were bonded to movable terminals and fixed terminals of the relays (two contact pairs were formed from a total of four contacts). Regarding the size of the contact (size of the head portion of the rivet), the movable contact has a diameter of 3.15 mm and a thickness of 0.75 mm (the area of a contact surface in observation of the head portion from the upper surface is 7.79 $mm^2$), and the fixed contact has a diameter of 3.3 mm and a thickness of 1.0 mm (the area of a contact surface in observation of the head portion from the upper surface is 8.55 $mm^2$). Arc-extinguishing magnets (two neodymium magnets having a magnetic flux density of 200 mT and containing neodymium, that is, a rare earth element) were disposed on the periphery of the movable contact and the fixed contact. The magnetic flux density at the central position in contacting of the contacts was 26 mT as measured with a gaussmeter.

In this embodiment, the operation conditions for the DC high-voltage relay were set as follows: voltage/current: DC 360 V/400 A, and contact force/opening force of movable contact: 75 gf/125 gf. The setting of the contact force was adjusted by the strength of a contact pressure spring, and the setting of the opening force was adjusted by the strength of a restoration spring. The DC high-voltage relay used for this evaluation test had a double-break structure, ½ of the force exerted on each contact pairs by the contact pressure spring and the restoration spring was defined as the contact force and the opening force.

In the evaluation of interruption durability of the DC high-voltage relay of the present embodiment, a switching operation of the contacts was performed 10 times, and it was confirmed whether or not the contacts were welded after each switching operation. A relay in which the contacts were not welded after performing the switching operation 10 times was evaluated as acceptable (o), and a relay in which the contacts were welded before performing the switching operation 10 times was evaluated as unacceptable (x).

[Evaluation of Arc Discharge Property in DC High-Voltage Relay]

Next, DC high-voltage relays in which the contact materials of the examples and comparative examples were respectively incorporated were manufactured, and an evaluation test for an arc discharge property of contacts was performed. Relays having a double-break structure similarly to those described above were prepared, and rivet-type contacts formed of the contact materials were bonded to movable terminals and fixed terminals of the relays. The size of the contacts and the magnetic flux density of arc-extinguishing magnets were the same as those described above.

In the evaluation test for an arc discharge property of the DC high-voltage relay performed in the present embodiment, a switching operation of the contacts was performed under conditions: voltage/current: DC 360 V/400 A, and the contact force/opening force of movable contact: 75 gf/125 gf, and an arc discharge property generated in contact opening was measured. In the measurement of an arc discharge property, an arc current waveform and an arc voltage waveform in contact opening was measured with an oscilloscope (WAVE SURFER 454VL, manufactured by Teledyne LeCroy, Inc.). Then, an arc power waveform was created based on a product of the arc current waveform and the arc voltage waveform, a time when arc discharge continued was defined as arc duration (msec), and an integrated value of the arc power waveform in the arc duration was calculated as arc energy (J). The arc discharge property was evaluated based on the length of the arc duration and the magnitude of the arc energy. In this evaluation of an arc discharge property, an average obtained with the number of measurements n=1 to 15 was defined as a property value.

[Measurement of Contact Resistance and Heat Generation in DC High-Voltage Relay]

Furthermore, the contacts respectively formed of the contact materials of the examples and comparative examples were measured for contact resistance. As the contact resistance, each of the contact materials was incorporated in a relay similar to that used in the evaluation test for an arc discharge property described above, and a value obtained in a state after performing a switching operation once under the same conditions was measured. The measurement of the contact resistance was performed after the switching operation with the DC high-voltage relay connected to a resistance measuring circuit (DC 5 V, 30 A) prepared separately from an interruption circuit. In the measurement of contact resistance with the resistance measuring circuit, a voltage drop between the terminals was measured at the time when a current (30 A) was continuously fed to the circuit for 30 minutes. A value obtained by dividing the measured voltage drop value (mV) by the fed current (30 A) was defined as the contact resistance (mΩ).

In addition, a temperature rise caused by heat generation at the contact was measured in contact resistance measurement. The heat generation was measured in terms of a temperature rise at a terminal portion for connecting the relay containing the contact material to the resistance measuring circuit. In this measurement, the temperatures of two terminals used as an anode-side terminal and a cathode-side terminal were measured at the time of elapse of 30 minutes after the start of continuous feeding of a current for the contact resistance measurement described above, an average of temperature differences between the measured temperature and room temperature was defined as a temperature rise (° C.). The measurement and evaluation of the contact resistance in the DC high-voltage relay were performed with the number of measurements n=1.

Tables 3 and 4 show evaluation results of the interruption durability, the arc discharge property, and the contact resistance/heat generation measurement in the DC high-voltage relays of the present embodiment.

TABLE 3

| | Composition (mass %)*[1] | | | | | | | | | Content of metal M (mass %) | Evaluation in DC high-voltage relay | | | | | | |
|---|---|---|---|---|---|---|---|---|---|---|---|---|---|---|---|---|---|
| | Ag | Zn | Sn | In | Ni | Te | Bi | Cu | Mg | | Contact force (gf) | Opening force (gf) | Interruption durability evaluation | Arc duration (msec.) | Arc energy (J) | Contact resistance (mΩ) | Heat generation (° C.) |
| Ex. 1 | Balance | 0.20 | — | — | — | — | — | — | — | 0.20 | 75 | 125 | ○ | 4.24 | 75.63 | 1.10 | 19.13 |
| Ex. 2 | | 1.00 | — | — | — | — | — | — | — | 1.00 | | | ○ | 4.48 | 75.16 | 1.37 | 20.80 |
| Ex. 3 | | 2.50 | — | — | — | — | — | — | — | 2.50 | | | ○ | 5.12 | 77.47 | 2.22 | 20.72 |
| Ex. 4 | | 5.00 | — | — | — | — | — | — | — | 5.00 | | | ○ | 5.59 | 84.47 | 2.40 | 28.15 |
| Ex. 5 | | 6.00 | — | — | — | — | — | — | — | 6.00 | | | ○ | 5.81 | 88.28 | 2.35 | 27.89 |
| Ex. 6 | | 6.50 | — | — | — | — | — | — | — | 6.50 | | | ○ | 5.59 | 89.59 | 2.28 | 27.30 |
| Ex. 7 | | 8.00 | — | — | — | — | — | — | — | 8.00 | | | ○ | 5.97 | 93.00 | 2.41 | 27.29 |
| Ex. 8 | | 0.60 | 0.40 | — | — | — | — | — | — | 1.00 | | | ○ | 5.19 | 78.61 | 1.99 | 25.83 |
| Ex. 9 | | 2.40 | 1.60 | — | — | — | — | — | — | 4.00 | | | ○ | 5.51 | 78.22 | 2.49 | 28.65 |
| Ex. 10 | | 4.80 | 3.20 | — | — | — | — | — | — | 8.00 | | | ○ | 5.79 | 86.78 | 2.41 | 27.82 |
| Ex. 11 | | 0.20 | — | — | — | — | — | — | — | 0.20 | | | ○ | 4.65 | 75.05 | 0.97 | 19.51 |
| Ex. 12 | | 3.00 | — | — | — | — | — | — | — | 3.00 | | | ○ | 5.49 | 82.03 | 1.23 | 21.62 |
| Ex. 13 | | 0.33 | 0.67 | — | — | — | — | — | — | 1.00 | | | ○ | 5.24 | 85.26 | 2.38 | 28.45 |
| Ex. 14 | | 1.50 | 0.50 | — | — | — | — | — | — | 2.00 | | | ○ | 5.14 | 82.97 | 1.51 | 22.36 |
| Ex. 15 | | 1.00 | 1.00 | — | — | — | — | — | — | 2.00 | | | ○ | 5.15 | 86.57 | 2.53 | 29.48 |
| Ex. 16 | | 0.30 | 1.70 | — | — | — | — | — | — | 2.00 | | | ○ | 5.68 | 86.10 | 1.77 | 24.67 |
| Ex. 17 | | 3.90 | 0.10 | — | — | — | — | — | — | 4.00 | | | ○ | 5.25 | 85.74 | 2.07 | 27.24 |
| Ex. 18 | | 3.00 | 1.00 | — | — | — | — | — | — | 4.00 | | | ○ | 5.50 | 87.87 | 1.92 | 25.31 |
| Ex. 19 | | 2.00 | 2.00 | — | — | — | — | — | — | 4.00 | | | ○ | 5.43 | 85.05 | 2.05 | 27.54 |
| Ex. 20 | | 1.40 | 2.60 | — | — | — | — | — | — | 4.00 | | | ○ | 5.57 | 94.14 | 2.42 | 28.59 |
| Ex. 21 | | 0.60 | 3.40 | — | — | — | — | — | — | 4.00 | | | ○ | 5.64 | 93.37 | 2.12 | 27.18 |
| Ex. 22 | | 6.00 | 2.00 | — | — | — | — | — | — | 8.00 | | | ○ | 5.65 | 89.03 | 2.66 | 29.76 |
| Ex. 23 | | 4.00 | 4.00 | — | — | — | — | — | — | 8.00 | | | ○ | 5.67 | 94.47 | 1.79 | 24.44 |
| Ex. 24 | | 2.70 | 5.30 | — | — | — | — | — | — | 8.00 | | | ○ | 5.92 | 93.09 | 2.36 | 28.85 |
| Ex. 25 | | 1.00 | 7.00 | — | — | — | — | — | — | 8.00 | | | ○ | 5.81 | 99.54 | 2.44 | 29.46 |
| Ex. 26 | | 0.30 | 7.70 | — | — | — | — | — | — | 8.00 | | | ○ | 5.62 | 96.74 | 2.18 | 27.37 |
| Ex. 27 | | 0.50 | — | 0.10 | — | — | — | — | — | 0.60 | | | ○ | 4.49 | 75.68 | 1.48 | 23.85 |
| Ex. 28 | | 1.50 | — | 0.50 | — | — | — | — | — | 2.00 | | | ○ | 5.38 | 86.56 | 2.13 | 27.39 |
| Ex. 29 | | 1.00 | — | 1.00 | — | — | — | — | — | 2.00 | | | ○ | 5.34 | 86.90 | 1.71 | 23.73 |
| Ex. 30 | | 3.90 | — | 0.10 | — | — | — | — | — | 4.00 | | | ○ | 5.15 | 86.33 | 1.34 | 21.84 |
| Ex. 31 | | 3.00 | — | 1.00 | — | — | — | — | — | 4.00 | | | ○ | 5.47 | 89.35 | 1.35 | 21.35 |
| Ex. 32 | | 2.00 | — | 2.00 | — | — | — | — | — | 4.00 | | | ○ | 4.92 | 84.75 | 1.98 | 27.48 |
| Ex. 33 | | 6.00 | — | 2.00 | — | — | — | — | — | 8.00 | | | ○ | 5.56 | 90.55 | 1.33 | 21.49 |
| Ex. 34 | | 4.00 | — | 4.00 | — | — | — | — | — | 8.00 | | | ○ | 5.36 | 94.46 | 2.39 | 28.76 |
| Ex. 35 | | 4.00 | — | 4.00 | — | — | — | — | — | 8.00 | | | ○ | 5.57 | 84.07 | 1.54 | 22.36 |
| Ex. 36 | | 2.00 | — | 6.00 | — | — | — | — | — | 8.00 | | | ○ | 5.52 | 88.62 | 0.94 | 19.06 |
| Ex. 37 | | 0.50 | — | — | 0.50 | — | — | — | — | 1.00 | | | ○ | 5.36 | 85.48 | 2.30 | 28.24 |
| Ex. 38 | | 7.90 | — | — | 0.10 | — | — | — | — | 8.00 | | | ○ | 5.40 | 83.33 | 1.47 | 22.26 |
| Ex. 39 | | 6.80 | — | — | 1.20 | — | — | — | — | 8.00 | | | ○ | 5.52 | 81.71 | 1.55 | 23.94 |
| Ex. 40 | | 0.50 | — | — | — | 0.50 | — | — | — | 1.00 | | | ○ | 5.32 | 88.45 | 2.48 | 29.67 |
| Ex. 41 | | 4.50 | — | — | — | 1.50 | — | — | — | 6.00 | | | ○ | 5.73 | 91.55 | 2.46 | 29.68 |
| Ex. 42 | | 7.90 | — | — | — | 0.10 | — | — | — | 8.00 | | | ○ | 5.95 | 97.62 | 1.91 | 26.23 |
| Ex. 43 | | 0.50 | — | — | — | — | 0.50 | — | — | 1.00 | | | ○ | 5.26 | 89.76 | 2.23 | 27.95 |
| Ex. 44 | | 7.90 | — | — | — | — | 0.10 | — | — | 8.00 | | | ○ | 5.26 | 93.26 | 1.78 | 25.48 |
| Ex. 45 | | 5.70 | 0.10 | 0.10 | 0.10 | — | — | — | — | 6.00 | | | ○ | 5.37 | 83.26 | 1.65 | 25.29 |
| Ex. 46 | | 5.60 | 0.10 | 0.10 | 0.10 | 0.10 | — | — | — | 6.00 | | | ○ | 5.48 | 97.27 | 1.61 | 24.32 |
| Ex. 47 | | 5.80 | 0.10 | — | — | — | 0.10 | — | — | 6.00 | | | ○ | 5.59 | 91.61 | 2.14 | 27.62 |
| Ex. 48 | | 3.40 | — | — | — | — | — | 3.40 | — | 6.80 | | | ○ | 5.26 | 83.21 | 1.87 | 25.79 |
| Ex. 49 | | 6.00 | — | — | — | — | — | — | — | 6.00 | | | ○ | 5.32 | 83.28 | 1.99 | 27.96 |

*[1]Concentration based on all metal components.

TABLE 4

| | Composition (mass %)*[1] | | | | | | | | | Content of metal M (mass %) | Evaluation in DC high-voltage relay | | | | | | |
|---|---|---|---|---|---|---|---|---|---|---|---|---|---|---|---|---|---|
| | Ag | Zn | Sn | In | Ni | Te | Bi | Cl | Mg | | Contact force (gf) | Opening force (gf) | Interruption durability evaluation | Arc duration (msec.) | Arc energy (J) | Contact resistance (mΩ) | Heat generation (° C.) |
| Comp. Ex. 1 | Balance | — | 3.60 | 1.30 | 0.10 | — | — | — | — | 5.00 | 75 | 125 | ○ | 6.18 | 100.17 | 3.03 | 31.27 |
| Comp. Ex. 2 | | — | 3.30 | 1.30 | 0.10 | 0.30 | — | — | — | 5.00 | | | ○ | 6.05 | 100.08 | 3.20 | 32.86 |
| Comp. Ex. 3 | | — | 5.90 | 1.90 | 0.20 | — | — | — | — | 8.00 | | | ○ | 6.94 | 102.68 | 5.97 | 49.52 |
| Comp. Ex. 4 | | — | 6.40 | 2.50 | 0.10 | 1.00 | — | — | — | 10.00 | | | ○ | 7.04 | 107.78 | 7.56 | 59.92 |
| Comp. Ex. 5 | | 10.80 | — | — | — | — | — | — | — | 10.80 | | | ○ | 6.60 | 103.12 | 4.45 | 43.44 |
| Comp. Ex. 6 | | 0.10 | — | — | — | — | — | — | — | 0.10 | | | x | 4.18 | 78.36 | 1.11 | 19.61 |
| Comp. Ex. 7 | | 0.10 | — | — | — | — | — | — | — | 0.10 | | | x | 4.24 | 79.93 | 1.34 | 21.57 |
| Comp. Ex. 8 | | 11.00 | — | — | — | — | — | — | — | 11.00 | | | ○ | 6.25 | 105.23 | 7.91 | 64.68 |
| Comp. Ex. 9 | | 0.30 | 9.00 | — | — | — | — | — | — | 9.30 | | | ○ | 6.76 | 103.59 | 3.13 | 34.98 |
| Comp. Ex. 10 | | 0.50 | — | — | — | 1.50 | — | — | — | 2.00 | | | x | 5.53 | 91.14 | 1.68 | 25.26 |
| Comp. Ex. 11 | | 3.50 | — | — | — | 2.50 | — | — | — | 6.00 | | | x | 5.23 | 96.73 | 5.04 | 45.45 |
| Comp. Ex. 12 | | 0.50 | — | — | — | — | 1.50 | — | — | 2.00 | | | x | 5.35 | 90.35 | 1.89 | 26.75 |
| Comp. Ex. 13 | | 4.50 | — | — | — | — | 1.50 | — | — | 6.00 | | | x | 5.82 | 94.45 | 2.29 | 28.93 |
| Comp. Ex. 14 | | 3.50 | — | — | — | — | 2.50 | — | — | 6.00 | | | x | 5.83 | 97.84 | 2.34 | 29.60 |
| Comp. Ex. 15 | | — | 0.20 | — | — | — | — | — | — | 0.20 | | | ○ | 6.25 | 101.43 | 1.54 | 24.23 |
| Comp. Ex. 16 | | — | 1.00 | — | — | — | — | — | — | 1.00 | | | ○ | 6.34 | 100.85 | 2.47 | 29.43 |
| Comp. Ex. 17 | | — | 3.00 | — | — | — | — | — | — | 3.00 | | | ○ | 6.37 | 104.18 | 3.16 | 34.44 |
| Comp. Ex. 18 | | — | 6.00 | — | — | — | — | — | — | 6.00 | | | ○ | 6.39 | 102.06 | 3.21 | 35.99 |
| Comp. Ex. 19 | | — | 5.00 | 1.00 | — | — | — | — | — | 6.00 | | | ○ | 6.75 | 110.68 | 3.13 | 33.80 |
| Comp. Ex. 20 | | — | 5.90 | — | — | — | 0.10 | — | — | 6.00 | | | ○ | 6.87 | 109.23 | 3.73 | 37.08 |
| Comp. Ex. 21 | | — | 8.00 | — | — | — | — | — | — | 8.00 | | | ○ | 6.45 | 105.84 | 4.56 | 43.03 |
| Comp. Ex. 22 | | 6.00 | — | — | — | — | — | — | — | 6.00 | | | x | 5.56 | 82.09 | 3.01 | 34.89 |
| Comp. Ex. 23 | 100 | — | — | — | — | — | — | — | — | 0.00 | | | x | 4.09 | 77.94 | 0.96 | 17.57 |

*[1]Concentration based on all metal components.

From the evaluation results shown in Table 4, it was first confirmed that pure Ag is inadequate as a contact material for a DC high-voltage relay. In the DC high-voltage relay in which pure Ag was applied to the contacts (Comparative Example 23), welding occurred when the number of interruptions was less than 10. The relay interruption test was performed in the present embodiment under comparatively severe conditions, but it is not preferable that welding occurs when a switching operation is performed less than 10 times.

On the other hand, it is deemed that the DC high-voltage relays respectively using the contact materials essentially containing Zn as metal M (Examples 1 to 49) have interruption durability. In these examples, it is understood that the arc duration is shortened, the arc energy is reduced, and hence the arc discharge property is excellent.

In this embodiment, DC high-voltage relays respectively using, as a general contact material for a relay, the contact material in which Zn was not contained and the content of metal M including Sn, In and the like was about 10% by mass (Comparative Example 4), and the contact materials in which Zn was not contained and the content of Sn, In and the like was comparatively small (Comparative Examples 1 to 3, and 15 to 21) were also evaluated, and it was confirmed that all of these were inferior in the arc discharge property to the examples. This result is deemed to indicate that an arc discharge property is improved by using Zn as an essential constituent element of the contact material. When the content of Zn is more than 8% by mass, however, an arc discharge property is equivalent to that of the conventional contact material (Comparative Examples 5 and 8). Therefore, the upper limit of the content of metal M including Zn needs to be about 8% by mass. Regarding the average particle size of oxide particles in the contact material, since Comparative Examples 10 to 14 were poor in the interruption durability, it is understood that the average particle size of oxide particles needs to be 0.4 μm or less.

Besides, regarding the problems of contact resistance and heat generation, the results of measurement performed with the contact materials actually incorporated in the relays show superiority of the contact materials of Examples 1 to 49. The contact materials of examples have a lower temperature rise value as compared to those of comparative examples. The amount of heat generation at contacts is proportional to a square of current and a contact resistance value. In the measurement test in this embodiment, a relatively low current of 30 A is fed, but when the fed current increases with the contact material applied to an actual DC high-voltage relay, the temperature rise further increases.

Metal M of the contact material applied in the present invention essentially contains Zn, and may also contain metals other than Zn (Sn). Through comparison with the comparative examples, an arc discharge property and contact resistance are excellent even when another metal is added in addition to Zn (Examples 8 to 10, and 13 to 48). In a Ag oxide-based contact material, a Sn oxide ($SnO_2$) and the like has an action of improving welding resistance. Therefore, when a Ag oxide-based contact material containing Sn in addition to Zn is used, both an arc discharge property and welding resistance can be adjusted. Another metal to be added in addition to Zn does not have an advantageous action on an arc discharge property, and hence the addition is not essential.

Second Embodiment: In this embodiment, DC high-voltage relays similar to those of the first embodiment in which a magnetic force of an arc-extinguishing magnet was set to be low were manufactured, and arc discharge properties obtained when contact materials of examples and comparative examples were respectively incorporated therein were evaluated.

In this embodiment, DC high-voltage relays having a double-break structure similarly to those of the first embodiment were prepared, and rivet-type contacts formed of the contact materials were bonded to movable terminals and fixed terminals of the relays. The size of the contacts was the same as that of the first embodiment. One neodymium magnet having a magnetic flux density of 200 mT was disposed as an arc-extinguishing magnet on the periphery of the movable contact and the fixed contact, and thus, the usage of neodymium, that is, a rare earth element, was reduced as compared with that in the first embodiment. A magnetic flux density at the central position in contacting of the contacts was 13 mT as measured with a gaussmeter.

An evaluation test for an arc discharge property of the DC high-voltage relays performed in the present embodiment is the same as that performed in the first embodiment, and a switching operation of the contacts was performed under conditions: voltage/current: DC 360 V/400 A, and the contact force/opening force of movable contact: 75 gf/125 gf, and an arc discharge property obtained in each operation was evaluated. Then, the arc discharge property was measured as an index in the same manner as in the first embodiment. In this evaluation of an arc discharge property, an average obtained with the number of measurements n=1 to 15 was adopted. Tables 5 and 6 show measurement results.

TABLE 5

| | Composition (mass %)*[1] | | | | | | | | | Content of metal M | High-voltage evaluation (13 mT) | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Ex. 1 | Balance | 0.20 | — | — | — | — | — | — | — | 0.20 | 75 | 125 | ○ | 6.00 | 100.67 |
| Ex. 2 | | 1.00 | — | — | — | — | — | — | — | 1.00 | | | ○ | 6.41 | 101.43 |
| Ex. 3 | | 2.50 | — | — | — | — | — | — | — | 2.50 | | | ○ | 6.84 | 103.01 |
| Ex. 4 | | 5.00 | — | — | — | — | — | — | — | 5.00 | | | ○ | 6.71 | 101.13 |
| Ex. 5 | | 6.00 | — | — | — | — | — | — | — | 6.00 | | | ○ | 7.06 | 105.79 |
| Ex. 6 | | 6.50 | — | — | — | — | — | — | — | 6.50 | | | ○ | 7.03 | 107.09 |
| Ex. 7 | | 8.00 | — | — | — | — | — | — | — | 8.00 | | | ○ | 7.46 | 109.56 |
| Ex. 8 | | 0.60 | 0.40 | — | — | — | — | — | — | 1.00 | | | ○ | 6.45 | 105.42 |
| Ex. 9 | | 2.40 | 1.60 | — | — | — | — | — | — | 4.00 | | | ○ | 7.57 | 103.92 |
| Ex. 10 | | 4.80 | 3.20 | — | — | — | — | — | — | 8.00 | | | ○ | 7.81 | 108.10 |
| Ex. 11 | | 0.20 | — | — | — | — | — | — | — | 0.20 | | | ○ | 5.98 | 102.88 |
| Ex. 12 | | 3.00 | — | — | — | — | — | — | — | 3.00 | | | ○ | 6.28 | 104.07 |
| Ex. 13 | | 0.33 | 0.67 | — | — | — | — | — | — | 1.00 | | | ○ | 6.66 | 108.88 |
| Ex. 14 | | 1.50 | 0.50 | — | — | — | — | — | — | 2.00 | | | ○ | 6.46 | 101.78 |
| Ex. 15 | | 1.00 | 1.00 | — | — | — | — | — | — | 2.00 | | | ○ | 6.46 | 104.07 |
| Ex. 16 | | 0.30 | 1.70 | — | — | — | — | — | — | 2.00 | | | ○ | 6.85 | 104.83 |
| Ex. 17 | | 3.90 | 0.10 | — | — | — | — | — | — | 4.00 | | | ○ | 6.83 | 102.45 |
| Ex. 18 | | 3.00 | 1.00 | — | — | — | — | — | — | 4.00 | | | ○ | 6.84 | 102.26 |
| Ex. 19 | | 2.00 | 2.00 | — | — | — | — | — | — | 4.00 | | | ○ | 6.98 | 104.17 |
| Ex. 20 | | 1.40 | 2.60 | — | — | — | — | — | — | 4.00 | | | ○ | 6.78 | 104.32 |
| Ex. 21 | | 0.60 | 3.40 | — | — | — | — | — | — | 4.00 | | | ○ | 7.16 | 108.27 |
| Ex. 22 | | 6.00 | 2.00 | — | — | — | — | — | — | 8.00 | | | ○ | 7.44 | 107.89 |
| Ex. 23 | | 4.00 | 4.00 | — | — | — | — | — | — | 8.00 | | | ○ | 6.68 | 108.01 |
| Ex. 24 | | 2.70 | 5.30 | — | — | — | — | — | — | 8.00 | | | ○ | 7.80 | 109.03 |
| Ex. 25 | | 1.00 | 7.00 | — | — | — | — | — | — | 8.00 | | | ○ | 7.57 | 111.16 |
| Ex. 26 | | 0.30 | 7.70 | — | — | — | — | — | — | 8.00 | | | ○ | 7.19 | 107.24 |
| Ex. 27 | | 0.50 | — | 0.10 | — | — | — | — | — | 0.60 | | | ○ | 6.33 | 102.47 |
| Ex. 28 | | 1.50 | — | 0.50 | — | — | — | — | — | 2.00 | | | ○ | 6.58 | 103.38 |
| Ex. 29 | | 1.00 | — | 1.00 | — | — | — | — | — | 2.00 | | | ○ | 6.76 | 104.74 |
| Ex. 30 | | 3.90 | — | 0.10 | — | — | — | — | — | 4.00 | | | ○ | 6.57 | 102.67 |
| Ex. 31 | | 3.00 | — | 1.00 | — | — | — | — | — | 4.00 | | | ○ | 6.76 | 103.34 |
| Ex. 32 | | 2.00 | — | 2.00 | — | — | — | — | — | 4.00 | | | ○ | 6.73 | 104.45 |
| Ex. 33 | | 6.00 | — | 2.00 | — | — | — | — | — | 8.00 | | | ○ | 7.46 | 106.85 |
| Ex. 34 | | 4.00 | — | 4.00 | — | — | — | — | — | 8.00 | | | ○ | 7.48 | 107.60 |
| Ex. 35 | | 4.00 | — | 4.00 | — | — | — | — | — | 8.00 | | | ○ | 7.08 | 103.84 |
| Ex. 36 | | 2.00 | — | 6.00 | — | — | — | — | — | 8.00 | | | ○ | 6.73 | 106.74 |

TABLE 5-continued

| | Composition (mass %)*[1] | | | | | | | | | Content of metal M | High-voltage evaluation (13 mT) | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Ex. 37 | | 0.50 | — | — | 0.50 | — | — | — | — | 1.00 | | | ○ | 6.50 | 108.33 |
| Ex. 38 | | 7.90 | — | — | 0.10 | — | — | — | — | 8.00 | | | ○ | 7.08 | 109.68 |
| Ex. 39 | | 6.80 | — | — | 1.20 | — | — | — | — | 8.00 | | | ○ | 7.02 | 103.86 |
| Ex. 40 | | 0.50 | — | — | — | 0.50 | — | — | — | 1.00 | | | ○ | 6.76 | 109.92 |
| Ex. 41 | | 4.50 | — | — | — | 1.50 | — | — | — | 6.00 | | | ○ | 7.08 | 104.81 |
| Ex. 42 | | 7.90 | — | — | — | 0.10 | — | — | — | 8.00 | | | ○ | 7.05 | 104.94 |
| Ex. 43 | | 0.50 | — | — | — | — | 0.50 | — | — | 1.00 | | | ○ | 6.72 | 110.67 |
| Ex. 44 | | 7.90 | — | — | — | — | 0.10 | — | — | 8.00 | | | ○ | 7.17 | 108.10 |
| Ex. 45 | | 5.70 | 0.10 | 0.10 | 0.10 | — | — | — | — | 6.00 | | | ○ | 6.28 | 103.15 |
| Ex. 46 | | 5.60 | 0.10 | 0.10 | 0.10 | 0.10 | — | — | — | 6.00 | | | ○ | 6.52 | 108.14 |
| Ex. 47 | | 5.80 | 0.10 | — | — | — | 0.10 | — | — | 6.00 | | | ○ | 6.46 | 107.14 |
| Ex. 48 | | 3.40 | — | — | — | — | — | 3.40 | — | 6.80 | | | ○ | 6.79 | 107.58 |
| Ex. 49 | | 6.00 | — | — | — | — | — | — | — | 6.00 | | | ○ | 7.31 | 103.03 |

*[1]Concentration based on all metal components.

TABLE 6

| | Composition (mass %)*[1] | | | | | | | | | Content of metal M | High-voltage evaluation (13 mT) | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Comp. Ex. 1 | Balance | — | 3.60 | 1.30 | 0.10 | — | — | — | — | 5.00 | 75 | 125 | ○ | 8.30 | 117.14 |
| Comp. Ex. 2 | | — | 3.30 | 1.30 | 0.10 | 0.30 | — | — | — | 5.00 | | | ○ | 8.07 | 115.34 |
| Comp. Ex. 3 | | — | 5.90 | 1.90 | 0.20 | — | — | — | — | 8.00 | | | ○ | 8.86 | 125.05 |
| Comp. Ex. 4 | | — | 6.40 | 2.50 | 0.10 | 1.00 | — | — | — | 10.00 | | | ○ | 9.10 | 134.10 |
| Comp. Ex. 5 | | 10.80 | — | — | — | — | — | — | — | 10.80 | | | ○ | 8.08 | 115.72 |
| Comp. Ex. 6 | | 0.10 | — | — | — | — | — | — | — | 0.10 | | | x | 5.88 | 99.84 |
| Comp. Ex. 7 | | 0.10 | — | — | — | — | — | — | — | 0.10 | | | x | 5.80 | 99.15 |
| Comp. Ex. 8 | | 11.00 | — | — | — | — | — | — | — | 11.00 | | | ○ | 8.35 | 132.78 |
| Comp. Ex. 9 | | 0.30 | 9.00 | — | — | — | — | — | — | 9.30 | | | ○ | 8.25 | 135.46 |
| Comp. Ex. 15 | | — | 0.20 | — | — | — | — | — | — | 0.20 | | | ○ | 8.63 | 118.92 |
| Comp. Ex. 16 | | — | 1.00 | — | — | — | — | — | — | 1.00 | | | ○ | 8.05 | 118.03 |
| Comp. Ex. 17 | | — | 3.00 | — | — | — | — | — | — | 3.00 | | | ○ | 8.24 | 116.34 |
| Comp. Ex. 18 | | — | 6.00 | — | — | — | — | — | — | 6.00 | | | ○ | 8.58 | 116.71 |
| Comp. Ex. 19 | | — | 5.00 | 1.00 | — | — | — | — | — | 6.00 | | | ○ | 8.67 | 114.61 |
| Comp. Ex. 20 | | — | 5.90 | — | — | — | 0.10 | — | — | 6.00 | | | ○ | 8.18 | 117.61 |
| Comp. Ex. 21 | | — | 8.00 | — | — | — | — | — | — | 8.00 | | | ○ | 8.07 | 125.38 |
| Comp. Ex. 23 | 100 | — | — | — | — | — | — | — | — | 0.00 | | | x | 5.32 | 79.80 |

*[1]Concentration based on all metal components.

In the DC high-voltage relays of the present embodiment, the magnetic force of an arc-extinguishing magnet was set to be a half of that of the first embodiment. The magnetic force reduction due to the reduction of the rare earth element increases arc duration and arc energy. Also under such circumstances, the arc duration and the arc energy of the contact material of each example containing Zn are suppressed. The result of this embodiment is deemed to support that the usage of a rare earth element is reduced by reducing the magnetic force of an arc-extinguishing magnet of a DC high-voltage relay.

Third Embodiment: In the first and second embodiments, DC high-voltage relays of double-break structure containing various contact materials (FIG. 1) were manufactured, and interruption durability tests were conducted in which interruption operations at the time of abnormality were simulated. In this embodiment, the DC high-voltage relay was mounted as a system main relay for a hybrid vehicle or the like, and switching operations in normal use were simulated to evaluate durability and contact resistance. The normal use refers to use conditions under loads from power source on/off operations in normal circuits.

Normal use conditions of the DC high-voltage relay which are intended by the present invention will be described in detail. In DC circuits for hybrid vehicles and the like, a precharge relay appropriate to an inrush current is installed for preventing damage of contacts of a system main relay by a high inrush current at the time when a power source is turned on. After the precharge relay absorbs the high inrush current, the power source of the system main relay is turned on.

Figure 3:
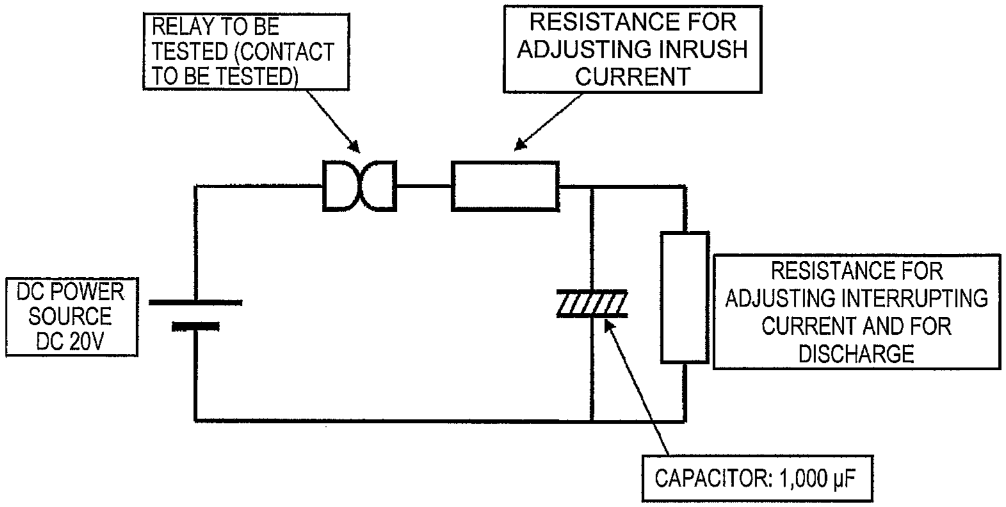
FIG. 3 is a diagram showing a circuit used in a capacitor load durability test in a third embodiment.

In this embodiment, a capacitor load durability test was conducted in which a DC high-voltage relay having the same structure as that of the first embodiment in which the contact material of each example was incorporated was incorporated in a test circuit as shown in FIG. 3, and switching operations of contacts with an inrush current reduced in the manner described above were simulated for evaluating durability. The test conditions for the capacitor load durability test in this embodiment were set as follows: voltage: DC 20 V, load current: 80 A (at the time of inrush)/1 A (at the time of interruption) and switching cycle: 1 second (on)/9 seconds (off). The contact force/opening force of the movable contact was set to 75 gf/125 gf. In this capacitor load durability test, the number of operations of 10,000 times was set as an acceptance criterion for durability life, and a relay in which the contacts were not welded within the number of operations of 10,000 times was evaluated as acceptable (o), and a relay in which defective operation such as welding at the contacts occurred within the number of operations of 10,000 times was evaluated as unacceptable (x).

In addition, in this embodiment, the contact resistance and the temperature rise (heat generation amount) were measured as in the first embodiment. After the capacitor load durability test, the contact resistance was measured with a change made to connection of the relay to a resistance measuring circuit (DC5V30A) which is different from a capacitor load durability test circuit. The measurement method was the same as in the first embodiment. In addition, a temperature rise caused by heat generation at the contact was measured in the contact resistance measurement.

In the measurement and evaluation in the capacitor load durability test performed in this embodiment, an average obtained with the number of measurements n=1 to 3 was adopted. Table 7 shows durability evaluation results and measurement results of contact resistance and temperature rise obtained in the present embodiment.

TABLE 7

| | Composition (mass %)*1 | | | | | | | | | Content of metal M | Capacitor load durability test | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Contact resistance (mΩ) | Heat generation (° C.) |
| Ex. 1 | Balance | 0.20 | — | — | — | — | — | — | — | 0.20 | 75 | 125 | ○ | 0.90 | 17.58 |
| Ex. 2 | | 1.00 | — | — | — | — | — | — | — | 1.00 | | | ○ | 0.86 | 17.24 |
| Ex. 3 | | 2.50 | — | — | — | — | — | — | — | 2.50 | | | ○ | 1.19 | 20.40 |
| Ex. 4 | | 5.00 | — | — | — | — | — | — | — | 5.00 | | | ○ | 1.45 | 21.37 |
| Ex. 5 | | 6.00 | — | — | — | — | — | — | — | 6.00 | | | ○ | 1.05 | 18.93 |
| Ex. 6 | | 6.50 | — | — | — | — | — | — | — | 6.50 | | | ○ | 1.22 | 19.65 |
| Ex. 7 | | 8.00 | — | — | — | — | — | — | — | 8.00 | | | ○ | 1.39 | 19.81 |
| Ex. 8 | | 0.60 | 0.40 | — | — | — | — | — | — | 1.00 | | | ○ | 1.09 | 19.49 |
| Ex. 9 | | 2.40 | 1.60 | — | — | — | — | — | — | 4.00 | | | ○ | 1.67 | 23.93 |
| Ex. 10 | | 4.80 | 3.20 | — | — | — | — | — | — | 8.00 | | | ○ | 1.87 | 24.09 |
| Ex. 11 | | 0.20 | — | — | — | — | — | — | — | 0.20 | | | ○ | 1.15 | 20.69 |
| Ex. 12 | | 3.00 | — | — | — | — | — | — | — | 3.00 | | | ○ | 1.50 | 24.01 |
| Ex. 13 | | 0.33 | 0.67 | — | — | — | — | — | — | 1.00 | | | ○ | 1.08 | 19.25 |
| Ex. 14 | | 1.50 | 0.50 | — | — | — | — | — | — | 2.00 | | | ○ | 1.23 | 20.43 |
| Ex. 15 | | 1.00 | 1.00 | — | — | — | — | — | — | 2.00 | | | ○ | 1.17 | 20.28 |
| Ex. 16 | | 0.30 | 1.70 | — | — | — | — | — | — | 2.00 | | | ○ | 1.31 | 21.93 |
| Ex. 17 | | 3.90 | 0.10 | — | — | — | — | — | — | 4.00 | | | ○ | 1.58 | 23.52 |
| Ex. 18 | | 3.00 | 1.00 | — | — | — | — | — | — | 4.00 | | | ○ | 1.40 | 21.26 |
| Ex. 19 | | 2.00 | 2.00 | — | — | — | — | — | — | 4.00 | | | ○ | 1.67 | 23.64 |
| Ex. 20 | | 1.40 | 2.60 | — | — | — | — | — | — | 4.00 | | | ○ | 1.48 | 22.00 |
| Ex. 21 | | 0.60 | 3.40 | — | — | — | — | — | — | 4.00 | | | ○ | 1.49 | 22.48 |
| Ex. 22 | | 6.00 | 2.00 | — | — | — | — | — | — | 8.00 | | | ○ | 1.31 | 21.70 |
| Ex. 23 | | 4.00 | 4.00 | — | — | — | — | — | — | 8.00 | | | ○ | 1.41 | 21.47 |
| Ex. 24 | | 2.70 | 5.30 | — | — | — | — | — | — | 8.00 | | | ○ | 1.25 | 22.05 |
| Ex. 25 | | 1.00 | 7.00 | — | — | — | — | — | — | 8.00 | | | ○ | 1.99 | 26.98 |
| Ex. 26 | | 0.30 | 7.70 | — | — | — | — | — | — | 8.00 | | | ○ | 1.74 | 24.89 |
| Ex. 27 | | 0.50 | — | 0.10 | — | — | — | — | — | 0.60 | | | ○ | 1.24 | 22.48 |
| Ex. 28 | | 1.50 | — | 0.50 | — | — | — | — | — | 2.00 | | | ○ | 1.55 | 22.92 |
| Ex. 29 | | 1.00 | — | 1.00 | — | — | — | — | — | 2.00 | | | ○ | 1.34 | 21.06 |
| Ex. 30 | | 3.90 | — | 0.10 | — | — | — | — | — | 4.00 | | | ○ | 1.45 | 23.48 |
| Ex. 31 | | 3.00 | — | 1.00 | — | — | — | — | — | 4.00 | | | ○ | 1.24 | 21.46 |
| Ex. 32 | | 2.00 | — | 2.00 | — | — | — | — | — | 4.00 | | | ○ | 1.77 | 23.70 |
| Ex. 33 | | 6.00 | — | 2.00 | — | — | — | — | — | 8.00 | | | ○ | 1.85 | 26.05 |
| Ex. 34 | | 4.00 | — | 4.00 | — | — | — | — | — | 8.00 | | | ○ | 1.64 | 21.36 |
| Ex. 35 | | 4.00 | — | 4.00 | — | — | — | — | — | 8.00 | | | ○ | 1.69 | 23.54 |
| Ex. 36 | | 2.00 | — | 6.00 | — | — | — | — | — | 8.00 | | | ○ | 1.65 | 23.54 |
| Ex. 37 | | 0.50 | — | — | 0.50 | — | — | — | — | 1.00 | | | ○ | 1.02 | 18.78 |
| Ex. 38 | | 7.90 | — | — | 0.10 | — | — | — | — | 8.00 | | | ○ | 1.59 | 23.74 |

TABLE 7-continued

| | Composition (mass %)*[1] | | | | | | | | | Content of metal M | Capacitor load durability test | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Contact resistance (mΩ) | Heat generation (° C.) |
| Ex. 39 | | 6.80 | — | — | 1.20 | — | — | — | — | 8.00 | | | ○ | 1.27 | 22.45 |
| Ex. 40 | | 0.50 | — | — | — | 0.50 | — | — | — | 1.00 | | | ○ | 1.47 | 22.22 |
| Ex. 41 | | 4.50 | — | — | — | 1.50 | — | — | — | 6.00 | | | ○ | 1.63 | 23.94 |
| Ex. 42 | | 7.90 | — | — | — | 0.10 | — | — | — | 8.00 | | | ○ | 1.92 | 26.53 |
| Ex. 43 | | 0.50 | — | — | — | — | 0.50 | — | — | 1.00 | | | ○ | 1.69 | 23.29 |
| Ex. 44 | | 7.90 | — | — | — | — | 0.10 | — | — | 8.00 | | | ○ | 1.20 | 21.60 |
| Ex. 45 | | 5.70 | 0.10 | 0.10 | 0.10 | — | — | — | — | 6.00 | | | ○ | 1.55 | 24.48 |
| Ex. 46 | | 5.60 | 0.10 | 0.10 | 0.10 | 0.10 | — | — | — | 6.00 | | | ○ | 1.39 | 22.99 |
| Ex. 47 | | 5.80 | 0.10 | — | — | — | 0.10 | — | — | 6.00 | | | ○ | 1.32 | 22.58 |
| Ex. 48 | | 3.40 | — | — | — | — | — | 3.40 | — | 6.80 | | | ○ | 1.42 | 22.93 |
| Ex. 49 | | 6.00 | — | — | — | — | — | — | — | 6.00 | | | ○ | 1.10 | 21.67 |

*[1]Concentration based on all metal components.

Table 7 reveals that the DC high-voltage relays of the examples were acceptable for the durability test in the load during normal use (number of operations: 10,000 times). In addition, both contact resistance and heat generation had low values in the same manner as in the examples of the other embodiments. From the evaluation results of the present embodiment, it was confirmed that the DC high-voltage relays of the examples in which the contact materials containing Zn as an essential metal and reduced in the amount of oxides are applied can usefully function even in consideration of actual use conditions in a hybrid vehicle and the like.

From the results of the above first to third embodiments, it was confirmed that the DC high-voltage relay of the present invention operates suitably as a DC high-voltage relay due to optimization of the configurations of the contact materials of the movable contact and the fixed contact. The DC high-voltage relay of the present invention can effectively operate with respect to interruption upon abnormal operations of the circuit, and stably operate in normal use.

Fourth Embodiment: In this embodiment, DC high-voltage relays in which a magnetic force of an arc-extinguishing magnet was set to be intermediate between that of the first embodiment (26 mT) and that of the second embodiment (13 mT) were manufactured, and arc discharge properties obtained when contact materials of examples and comparative examples were respectively incorporated therein were evaluated. DC high-voltage relays having a double-break structure similarly to those of the first embodiment were prepared, and one neodymium magnet having a magnetic flux density of 200 mT and one ferrite magnet having a magnetic flux density of 54 mT were disposed as arc-extinguishing magnets on the periphery of the movable contact and the fixed contact. Thus, the usage of a rare earth element was reduced by using a ferrite magnet not containing neodymium, that is, a rare earth element, with the same number of magnets used as in the first embodiment. A magnetic flux density at the central position in contacting of the contacts was 18 mT as measured with a gaussmeter.

Then, in the same manner as in the first and second embodiments, a switching operation of the contacts was performed under conditions: voltage/current: DC 360 V/400 A, and the contact force/opening force of movable contact: 75 gf/125 gf, and an arc discharge property obtained in each operation was evaluated. An average obtained with the number of measurements n=1 to 15 was adopted. Table 8 shows measurement results. In this embodiment, the contact materials of Examples 1, 2, 5, 7, 12, 25, 35, 38, 42, 44 to 46, and 48 and Comparative Examples 2, 3, 5, 9, 15 to 18, 20, 21 and 23 were used.

TABLE 8

| | Composition (mass %)*[1] | | | | | | | | | Content of metal M | Evaluation in DC high-voltage relay(18 mT) | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Ex. 1 | Balance | 0.20 | — | — | — | — | — | — | — | 0.20 | 75 | 125 | ○ | 4.79 | 90.98 |
| Ex. 2 | | 1.00 | — | — | — | — | — | — | — | 1.00 | | | ○ | 5.08 | 92.20 |
| Ex. 5 | | 6.00 | — | — | — | — | — | — | — | 6.00 | | | ○ | 5.93 | 100.70 |
| Ex. 7 | | 8.00 | — | — | — | — | — | — | — | 8.00 | | | ○ | 6.13 | 101.48 |
| Ex. 12 | | 3.00 | — | — | — | — | — | — | — | 3.00 | | | ○ | 5.78 | 94.13 |
| Ex. 25 | | 1.00 | 7.00 | — | — | — | — | — | — | 8.00 | | | ○ | 5.71 | 97.95 |
| Ex. 35 | | 4.00 | — | 4.00 | — | — | — | — | — | 8.00 | | | ○ | 5.51 | 93.09 |
| Ex. 38 | | 7.90 | — | — | 0.10 | — | — | — | — | 8.00 | | | ○ | 5.96 | 95.20 |
| Ex. 42 | | 7.90 | — | — | — | 0.10 | — | — | — | 8.00 | | | ○ | 5.52 | 89.73 |
| Ex. 44 | | 7.90 | — | — | — | — | 0.10 | — | — | 8.00 | | | ○ | 5.81 | 92.55 |
| Ex. 45 | | 5.70 | 0.10 | 0.10 | 0.10 | — | — | — | — | 6.00 | | | ○ | 5.48 | 92.14 |
| Ex. 46 | | 5.60 | 0.10 | 0.10 | 0.10 | 0.10 | — | — | — | 6.00 | | | ○ | 5.92 | 97.12 |
| Ex. 48 | | 3.40 | — | — | — | — | — | 3.40 | — | 6.80 | | | ○ | 5.67 | 90.80 |
| Comp. Ex. 2 | | — | 3.30 | 1.30 | 0.10 | 0.30 | — | — | — | 5.00 | | | ○ | 6.31 | 104.25 |
| Comp. Ex. 3 | | — | 5.90 | 1.90 | 0.20 | — | — | — | — | 8.00 | | | ○ | 6.97 | 108.14 |

TABLE 8-continued

| | Composition (mass %)*[1] | | | | | | | | | Content of metal M | Evaluation in DC high-voltage relay(18 mT) | | | | |
|---|---|---|---|---|---|---|---|---|---|---|---|---|---|---|---|
| | | | | | | | | | | | Contact force | Opening force | Interruption durability | Arc duration | Arc energy |
| | Ag | Zn | Sn | In | Ni | Te | Bi | Cu | Mg | (mass %) | (gf) | (gf) | evaluation | (msec.) | (J) |
| Comp. Ex. 5 | | 10.80 | — | — | — | — | — | — | — | 10.80 | | | ○ | 6.60 | 104.96 |
| Comp. Ex. 9 | | 0.30 | 9.00 | — | — | — | — | — | — | 9.30 | | | ○ | 6.38 | 106.04 |
| Comp. Ex. 15 | | — | 0.20 | — | — | — | — | — | — | 0.20 | | | ○ | 6.25 | 104.43 |
| Comp. Ex. 16 | | — | 1.00 | — | — | — | — | — | — | 1.00 | | | ○ | 6.34 | 106.54 |
| Comp. Ex. 17 | | — | 3.00 | — | — | — | — | — | — | 3.00 | | | ○ | 6.32 | 104.89 |
| Comp. Ex. 18 | | — | 6.00 | — | — | — | — | — | — | 6.00 | | | ○ | 6.28 | 104.48 |
| Comp. Ex. 20 | | — | 5.90 | — | — | — | 0.10 | — | — | 6.00 | | | ○ | 6.27 | 104.48 |
| Comp. Ex. 21 | | — | 8.00 | — | — | — | — | — | — | 8.00 | | | ○ | 6.68 | 106.82 |
| Comp. Ex. 23 | 100 | — | — | — | — | — | — | — | — | 0.00 | | | x | 4.14 | 79.77 |

*[1]Concentration based on all metal components.

Table 8 reveals that arc duration and arc energy are suppressed in the DC high-voltage relays using the contact materials of the examples containing Zn. In this respect, this embodiment is the same as the second embodiment. According to the present embodiment, applicability of a magnet different from a rare earth magnet (neodymium magnet) to an arc-extinguishing magnet mounted on a DC high-voltage relay can be confirmed. Also the contents of this embodiment are deemed to support the reduction of the usage of a rare earth element.

Fifth Embodiment: In this embodiment, DC high-voltage relays in which the contact force was increased with the opening force reduced as compared with those of the DC high-voltage relays of the first to fourth embodiments were manufactured. In this embodiment, arc discharge properties of DC high-voltage relays having a double-break structure and having the contact force/opening force of 100 gf/90 gf were evaluated. The other evaluation conditions were the same as those of the first embodiment. In this embodiment, the contact materials of Examples 1, 2, 5, 7, 12, 25, 35, 38, 42, 44 to 46 and 48 and Comparative examples 2, 3, 5, 9, 15 to 18, 20 and 21 were used.

Besides, in this embodiment, a DC high-voltage relay in which both the contact force and the opening force were less than 100 gf was also evaluated as a reference example. The contact materials of Examples 1 and 2 were used to manufacture DC high-voltage relays having a double-break structure in which the strength of a contact pressure spring and a restoration spring was lower than that of the first to fourth embodiment (Reference Examples 1 and 2). Then, a switching operation of the contacts was similarly performed to evaluate an arc discharge property in each operation. Table 9 shows results.

TABLE 9

| | Composition (mass %)*[1] | | | | | | | | | Content of metal M | Evaluation in DC high-voltage relay | | | | |
|---|---|---|---|---|---|---|---|---|---|---|---|---|---|---|---|
| | | | | | | | | | | | Contact force | Opening force | Interruption durability | Arc duration | Arc energy |
| | Ag | Zn | Sn | In | Ni | Te | Bi | Cu | Mg | (mass %) | (gf) | (gf) | evaluation | (msec.) | (J) |
| Ex. 1 | Balance | 0.20 | — | — | — | — | — | — | — | 0.20 | 100 | 90 | ○ | 4.35 | 77.32 |
| Ex. 2 | | 1.00 | — | — | — | — | — | — | — | 1.00 | | | ○ | 4.35 | 79.24 |
| Ex. 5 | | 6.00 | — | — | — | — | — | — | — | 6.00 | | | ○ | 5.91 | 89.92 |
| Ex. 7 | | 8.00 | — | — | — | — | — | — | — | 8.00 | | | ○ | 6.10 | 96.18 |
| Ex. 12 | | 3.00 | — | — | — | — | — | — | — | 3.00 | | | ○ | 5.39 | 89.22 |
| Ex. 25 | | 1.00 | 7.00 | — | — | — | — | — | — | 8.00 | | | ○ | 5.53 | 92.68 |
| Ex. 35 | | 4.00 | — | 4.00 | — | — | — | — | — | 8.00 | | | ○ | 5.71 | 86.76 |
| Ex. 38 | | 7.90 | — | — | 0.10 | — | — | — | — | 8.00 | | | ○ | 5.78 | 87.13 |
| Ex. 42 | | 7.90 | — | — | — | 0.10 | — | — | — | 8.00 | | | ○ | 5.74 | 88.16 |
| Ex. 44 | | 7.90 | — | — | — | — | 0.10 | — | — | 8.00 | | | ○ | 5.92 | 90.12 |
| Ex. 45 | | 5.70 | 0.10 | 0.10 | 0.10 | — | — | — | — | 6.00 | | | ○ | 5.31 | 88.86 |
| Ex. 46 | | 5.60 | 0.10 | 0.10 | 0.10 | 0.10 | — | — | — | 6.00 | | | ○ | 5.52 | 89.32 |
| Ex. 48 | | 3.40 | — | — | — | — | — | 3.40 | — | 6.80 | | | ○ | 5.86 | 89.12 |
| Comp. Ex. 2 | | — | 3.30 | 1.30 | 0.10 | 0.30 | — | — | — | 5.00 | | | ○ | 6.85 | 106.13 |
| Comp. Ex. 3 | | — | 5.90 | 1.90 | 0.20 | — | — | — | — | 8.00 | | | ○ | 6.70 | 106.19 |
| Comp. Ex. 5 | | 10.80 | — | — | — | — | — | — | — | 10.80 | | | ○ | 6.43 | 101.71 |

TABLE 9-continued

| | Composition (mass %)*[1] | | | | | | | | | Content of metal M | Evaluation in DC high-voltage relay | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Comp. Ex. 9 | | 0.30 | 9.00 | — | — | — | — | — | — | 9.30 | | | ○ | 6.65 | 101.92 |
| Comp. Ex. 15 | | — | 0.20 | — | — | — | — | — | — | 0.20 | | | ○ | 6.40 | 100.97 |
| Comp. Ex. 16 | | — | 1.00 | — | — | — | — | — | — | 1.00 | | | ○ | 6.58 | 101.87 |
| Comp. Ex. 17 | | — | 3.00 | — | — | — | — | — | — | 3.00 | | | ○ | 6.72 | 101.70 |
| Comp. Ex. 18 | | — | 6.00 | — | — | — | — | — | — | 6.00 | | | ○ | 6.80 | 105.54 |
| Comp. Ex. 20 | | — | 5.90 | — | — | — | 0.10 | — | — | 6.00 | | | ○ | 6.34 | 100.32 |
| Comp. Ex. 21 | | — | 8.00 | — | — | — | — | — | — | 8.00 | | | ○ | 6.38 | 101.02 |
| Reference Example 1 | Balance | 0.20 | — | — | — | — | — | — | — | 0.20 | 75 | 50 | x | 4.57 | 75.44 |
| Reference Example 2 | | 1.00 | — | — | — | — | — | — | — | 1.00 | | | x | 4.78 | 74.06 |

*[1]Concentration based on all metal components.

Table 9 reveals that also regarding a DC high-voltage relay in which the contact force is increased with the opening force reduced as compared with those of the first embodiment and the like, DC high-voltage relays using the contact materials of the examples are good in interruption durability, and arc duration and arc energy are suppressed. Referring to the results of Reference Examples 1 and 2, when the contact force and the opening force of a DC high-voltage relay are less than 100 gf, the interruption durability is inferior even when the contact materials of Examples 1 and 2 are applied. Although the content of metal M may be a cause, this is probably because the contact force or the opening force was too low (less than 100 gf).

Sixth Embodiment: In this embodiment, DC high-voltage relays having the same structure as that of the first embodiment in which the voltage/current were set to DC 200 V/200 A were manufactured. Besides, DC high-voltage relays in which the contact force and the opening force were set to be higher than in the first to fifth embodiments were manufactured, and arc discharge properties obtained when the contact materials of the examples and the comparative examples were incorporated therein were evaluated. For adjusting the contact force and the opening force, DC high-voltage relays having a double-break structure similar to that of the first embodiment were prepared, and those having larger strength of contact pressure springs and restoration springs were used. In this embodiment, two DC high-voltage relays, one of which having the contact force/opening force of 250 gf/600 gf and the other having the contact force/opening force of 500 gf/1250 gf, were manufactured, and a switching operation of contacts was performed in each of the relays to evaluate an arc discharge property in each operation. The other evaluation conditions were the same as those of the first embodiment. In this embodiment, the contact materials of Examples 1, 2, 5, 7, 12, 25, 35, 38, 42, 44 to 46 and 48 and Comparative Examples 2, 3, 5, 9, 15 to 18, 20 and 21 were used. Tables 10 and 11 show evaluation results of these.

TABLE 10

| | Composition (mass %)*[1] | | | | | | | | | Content of metal M | Evaluation in DC high-voltage relay | | | | |
|---|---|---|---|---|---|---|---|---|---|---|---|---|---|---|---|
| | Ag | Zn | Sn | In | Ni | Te | Bi | Cu | Mg | (mass %) | Contact force (gf) | Opening force (gf) | Interruption durability evaluation | Arc duration (msec.) | Arc energy (J) |
| Ex. 1 | Balance | 0.20 | — | — | — | — | — | — | — | 0.20 | 250 | 600 | ○ | 2.04 | 19.69 |
| Ex. 2 | | 1.00 | — | — | — | — | — | — | — | 1.00 | | | ○ | 2.03 | 19.41 |
| Ex. 5 | | 6.00 | — | — | — | — | — | — | — | 6.00 | | | ○ | 2.09 | 19.79 |
| Ex. 7 | | 8.00 | — | — | — | — | — | — | — | 8.00 | | | ○ | 2.07 | 19.86 |
| Ex. 12 | | 3.00 | — | — | — | — | — | — | — | 3.00 | | | ○ | 2.00 | 19.67 |
| Ex. 25 | | 1.00 | 7.00 | — | — | — | — | — | — | 8.00 | | | ○ | 2.14 | 19.62 |
| Ex. 35 | | 4.00 | — | 4.00 | — | — | — | — | — | 8.00 | | | ○ | 2.15 | 19.75 |
| Ex. 38 | | 7.90 | — | — | 0.10 | — | — | — | — | 8.00 | | | ○ | 2.12 | 19.16 |
| Ex. 42 | | 7.90 | — | — | — | 0.10 | — | — | — | 8.00 | | | ○ | 2.18 | 19.67 |
| Ex. 44 | | 7.90 | — | — | — | — | 0.10 | — | — | 8.00 | | | ○ | 2.16 | 18.53 |
| Ex. 45 | | 5.70 | 0.10 | 0.10 | 0.10 | — | — | — | — | 6.00 | | | ○ | 2.06 | 19.54 |
| Ex. 46 | | 5.60 | 0.10 | 0.10 | 0.10 | 0.10 | — | — | — | 6.00 | | | ○ | 2.01 | 19.85 |
| Ex. 48 | | 3.40 | — | — | — | — | — | 3.40 | — | 6.80 | | | ○ | 2.12 | 19.11 |
| Comp. Ex. 2 | | — | 3.30 | 1.30 | 0.10 | 0.30 | — | — | — | 5.00 | | | ○ | 2.54 | 20.53 |
| Comp. Ex. 3 | | — | 5.90 | 1.90 | 0.20 | — | — | — | — | 8.00 | | | ○ | 2.38 | 20.22 |

TABLE 10-continued

| | Composition (mass %)*[1] | | | | | | | | | Content of metal M | Evaluation in DC high-voltage relay | | | | |
|---|---|---|---|---|---|---|---|---|---|---|---|---|---|---|---|
| | | | | | | | | | | | Contact force | Opening force | Interruption durability | Arc duration | Arc energy |
| | Ag | Zn | Sn | In | Ni | Te | Bi | Cu | Mg | (mass %) | (gf) | (gf) | evaluation | (msec.) | (J) |
| Comp. Ex. 5 | | 10.80 | — | — | — | — | — | — | — | 10.80 | | | ○ | 2.48 | 20.81 |
| Comp. Ex. 9 | | 0.30 | 9.00 | — | — | — | — | — | — | 9.30 | | | ○ | 2.39 | 21.00 |
| Comp. Ex. 15 | | — | 0.20 | — | — | — | — | — | — | 0.20 | | | ○ | 2.31 | 20.20 |
| Comp. Ex. 16 | | — | 1.00 | — | — | — | — | — | — | 1.00 | | | ○ | 2.35 | 20.23 |
| Comp. Ex. 17 | | — | 3.00 | — | — | — | — | — | — | 3.00 | | | ○ | 2.30 | 20.40 |
| Comp. Ex. 18 | | — | 6.00 | — | — | — | — | — | — | 6.00 | | | ○ | 2.45 | 21.39 |
| Comp. Ex. 20 | | — | 5.90 | — | — | — | 0.10 | — | — | 6.00 | | | ○ | 2.33 | 20.16 |
| Comp. Ex. 21 | | — | 8.00 | — | — | — | — | — | — | 8.00 | | | ○ | 2.50 | 20.31 |

*[1]Concentration based on all metal components.

TABLE 11

| | Composition (mass %)*[1] | | | | | | | | | Content of metal M | Evaluation in DC high-voltage relay | | | | |
|---|---|---|---|---|---|---|---|---|---|---|---|---|---|---|---|
| | | | | | | | | | | | Contact force | Opening force | Interruption durability | Arc duration | Arc energy |
| | Ag | Zn | Sn | In | Ni | Te | Bi | Cu | Mg | (mass %) | (gf) | (gf) | evaluation | (msec.) | (J) |
| Ex. 1 | Balance | 0.20 | — | — | — | — | — | — | — | 0.20 | 500 | 1250 | ○ | 1.94 | 18.53 |
| Ex. 2 | | 1.00 | — | — | — | — | — | — | — | 1.00 | | | ○ | 2.01 | 19.76 |
| Ex. 5 | | 6.00 | — | — | — | — | — | — | — | 6.00 | | | ○ | 2.08 | 19.69 |
| Ex. 7 | | 8.00 | — | — | — | — | — | — | — | 8.00 | | | ○ | 2.09 | 19.40 |
| Ex. 12 | | 3.00 | — | — | — | — | — | — | — | 3.00 | | | ○ | 2.08 | 18.19 |
| Ex. 25 | | 1.00 | 7.00 | — | — | — | — | — | — | 8.00 | | | ○ | 2.11 | 19.71 |
| Ex. 35 | | 4.00 | — | 4.00 | — | — | — | — | — | 8.00 | | | ○ | 2.10 | 20.08 |
| Ex. 38 | | 7.90 | — | — | 0.10 | — | — | — | — | 8.00 | | | ○ | 2.06 | 18.89 |
| Ex. 42 | | 7.90 | — | — | — | 0.10 | — | — | — | 8.00 | | | ○ | 2.18 | 19.28 |
| Ex. 44 | | 7.90 | — | — | — | — | 0.10 | — | — | 8.00 | | | ○ | 2.11 | 18.66 |
| Ex. 45 | | 5.70 | 0.10 | 0.10 | 0.10 | — | — | — | — | 6.00 | | | ○ | 2.04 | 19.36 |
| Ex. 46 | | 5.60 | 0.10 | 0.10 | 0.10 | 0.10 | — | — | — | 6.00 | | | ○ | 2.03 | 18.54 |
| Ex. 48 | | 3.40 | — | — | — | — | — | 3.40 | — | 6.80 | | | ○ | 2.14 | 18.22 |
| Comp. Ex. 2 | | — | 3.30 | 1.30 | 0.10 | 0.30 | — | — | — | 5.00 | | | ○ | 2.40 | 20.51 |
| Comp. Ex. 3 | | — | 5.90 | 1.90 | 0.20 | — | — | — | — | 8.00 | | | ○ | 2.56 | 21.08 |
| Comp. Ex. 5 | | 10.80 | — | — | — | — | — | — | — | 10.80 | | | ○ | 2.45 | 20.45 |
| Comp. Ex. 9 | | 0.30 | 9.00 | — | — | — | — | — | — | 9.30 | | | ○ | 2.36 | 23.12 |
| Comp. Ex. 15 | | — | 0.20 | — | — | — | — | — | — | 0.20 | | | ○ | 2.33 | 20.55 |
| Comp. Ex. 16 | | — | 1.00 | — | — | — | — | — | — | 1.00 | | | ○ | 2.34 | 20.47 |
| Comp. Ex. 17 | | — | 3.00 | — | — | — | — | — | — | 3.00 | | | ○ | 2.33 | 20.51 |
| Comp. Ex. 18 | | — | 6.00 | — | — | — | — | — | — | 6.00 | | | ○ | 2.43 | 20.53 |
| Comp. Ex. 20 | | — | 5.90 | — | — | — | 0.10 | — | — | 6.00 | | | ○ | 2.39 | 20.79 |
| Comp. Ex. 21 | | — | 8.00 | — | — | — | — | — | — | 8.00 | | | ○ | 2.46 | 20.81 |

*[1]Concentration based on all metal components.

Referring to Tables 10 and 11, when the contact force and the opening force are increased, a DC high-voltage relay having a good arc property is obtained, and arc duration and arc energy tend to be reduced. This tendency was found not only in using the contact materials of the examples but also in using the contact materials not containing Zn (Comparative Examples 2, 3, 15 to 18, 20 and 21) and the contact materials having a high concentration of metal M (Comparative Examples 5 and 9). In comparison between an example and a comparative example having an equivalent content of metal M (amount of oxides) (for example, Example 5 and Comparative Example 18), however, it is understood that an effect of suppressing arc duration of 10% or more and arc energy of 5% or more is obtained in a DC high-voltage relay to which a contact material containing Zn is applied.

Besides, regarding a DC high-voltage relay to which the contact material having a high content of metal M is applied, arc duration and arc energy were larger than those of the examples. Although an arc property may be improved by increasing the contact force and the opening force in a DC high-voltage relay to which the contact material having a high content of metal M is applied, the problem of heat generation caused by contact resistance of the contact material is not solved.

INDUSTRIAL APPLICABILITY

The Ag oxide-based contact material that is applied in the DC high-voltage relay of the present invention exhibits an excellent arc discharge property, has low contact resistance, and generates a small amount of heat. The DC high-voltage relay of the present invention is free from the problems of arc discharge and heat generation at contact pair, and can perform reliable on/off control. The present invention is suitably applied to system main relays in power source circuits of high-voltage batteries in hybrid vehicles and the like, power conditioners in power supply systems such as solar power generation equipment, and the like.

The invention claimed is:

1. A DC high-voltage relay comprising at least one contact pair comprising a movable contact and a fixed contact, the contact pair having a contact force and/or an opening force of 100 gf or more, the DC high-voltage relay having a rated voltage of 48 V or more, wherein the movable contact and/or the fixed contact comprises a Ag oxide-based contact material, the contact material comprises one or more components including at least Zn, and a balance being Ag and inevitable impurity metals, the contact material has a content of the components of 0.2% by mass or more and 6.0% by mass or less based on a total mass of all metal components of the contact material, the contact material has a material structure in which one or more oxides of the components are dispersed in a matrix including Ag or a Ag alloy, and the oxides have an average particle size of 0.01 μm or more and 0.4 μm or less.

2. The DC high-voltage relay according to claim 1, wherein the contact material further contains at least one component selected from the group consisting of Sn, In, Ni, Te, Bi and Cu as additive elements, and the total content of the Zn and any additive elements is 0.2% by mass or more and 6.0% by mass or less based on the total mass of all the metal components of the contact material.

3. The DC high-voltage relay according to claim 2, comprising:

a drive section which generates and transmits a drive force for moving a movable contact; and a contact section which performs switching of a DC high-voltage circuit, the drive section comprises an electromagnet or a coil which generates a drive force; a transmission unit which transmits the drive force to the contact section; and a biasing unit which biases the transmission unit for closing or opening the contact pair, the contact section comprises at least one contact pair including a fixed contact and a movable contact which is moved by the transmission unit of the drive section; and at least one movable terminal bonded to the movable contact and at least one fixed terminal bonded to the fixed contact.

4. The DC high-voltage relay according to claim 2, wherein oxides on an arbitrary cross-section of the contact material has an area ratio of 0.1% or more and 20% or less.

5. The DC high-voltage relay according to claim 1, comprising:

a drive section which generates and transmits a drive force for moving a movable contact; and a contact section which performs switching of a DC high-voltage circuit, the drive section comprises an electromagnet or a coil which generates a drive force; a transmission unit which transmits the drive force to the contact section; and a biasing unit which biases the transmission unit for closing or opening the contact pair, the contact section comprises at least one contact pair including a fixed contact and a movable contact which is moved by the transmission unit of the drive section; and at least one movable terminal bonded to the movable contact and at least one fixed terminal bonded to the fixed contact.

6. The DC high-voltage relay according to claim 5, wherein oxides on an arbitrary cross-section of the contact material has an area ratio of 0.1% or more and 20% or less.

7. The DC high-voltage relay according to claim 1, wherein oxides on an arbitrary cross-section of the contact material has an area ratio of 0.1% or more and 20% or less.

8. A contact material for a DC high-voltage relay, the contact material being a Ag oxide-based contact material for forming at least a surface of a movable contact and/or a fixed contact of a DC high-voltage relay, the DC high-voltage relay having a rated voltage of 48 V or more, and a contact force and/or an opening force of 100 gf or more at a contact pair, wherein the contact material comprises one or more components including at least Zn, and a balance being Ag and inevitable impurity metals, the contact material has a content of the components of 0.2% by mass or more and 6.0% by mass or less based on a total mass of all metal components of the contact material, the contact material has a material structure in which one or more oxides of the components are dispersed in a matrix including Ag or a Ag alloy, and the oxides have an average particle size of 0.01 μm or more and 0.4 μm or less.

9. The contact material for a DC high-voltage relay according to claim 8, wherein the contact material further contains at least one component selected from the group consisting of Sn, In, Ni, Te, Bi and Cu as additive elements, and the total content of the Zn and any additive elements is 0.2% by mass or more and 6.0% by mass or less based on the total mass of all the metal components of the contact material.

10. The contact material for a DC high-voltage relay according to claim 9, wherein an area ratio of the oxides on an arbitrary cross-section is 0.1% or more and 20% or less.

11. The contact material for a DC high-voltage relay according to claim 8, wherein an area ratio of the oxides on an arbitrary cross-section is 0.1% or more and 20% or less.

* * * * *